(12) United States Patent
Levin et al.

(10) Patent No.: US 11,782,761 B2
(45) Date of Patent: Oct. 10, 2023

(54) RESOURCE MANAGEMENT UNIT FOR CAPTURING OPERATING SYSTEM CONFIGURATION STATES AND OFFLOADING TASKS

(71) Applicant: Google LLC, Mountain View, CA (US)

(72) Inventors: Alex Levin, Sunnyvale, CA (US); Todd Alan Broch, Gilroy, CA (US); Derek Basehore, Mountain View, CA (US)

(73) Assignee: Google LLC, Mountain View, CA (US)

( * ) Notice: Subject to any disclaimer, the term of this patent is extended or adjusted under 35 U.S.C. 154(b) by 0 days.

(21) Appl. No.: 18/052,329

(22) Filed: Nov. 3, 2022

(65) Prior Publication Data

US 2023/0088718 A1  Mar. 23, 2023

Related U.S. Application Data

(63) Continuation of application No. 16/912,419, filed on Jun. 25, 2020, now Pat. No. 11,526,380, which is a
(Continued)

(51) Int. Cl.
*G06F 9/50* (2006.01)
*G06F 9/38* (2018.01)
(Continued)

(52) U.S. Cl.
CPC .......... *G06F 9/5011* (2013.01); *G06F 9/3869* (2013.01); *G06F 9/44505* (2013.01);
(Continued)

(58) Field of Classification Search
CPC .................................................. G06F 9/5011
See application file for complete search history.

(56) References Cited

U.S. PATENT DOCUMENTS 5,928,321 A  7/1999  Ozcelik et al.
6,430,593 B1  8/2002  Lindsley
(Continued)

FOREIGN PATENT DOCUMENTS

CN  107403152  11/2017
CN  107451458  12/2017
(Continued)

OTHER PUBLICATIONS

"Advisory Action", U.S. Appl. No. 16/904,145, dated Feb. 28, 2023, 3 pages.
(Continued)

*Primary Examiner* — Charlie Sun
(74) *Attorney, Agent, or Firm* — Colby Nipper PLLC

(57) ABSTRACT

This disclosure describes methods, devices, systems, and procedures in a computing system for capturing a configuration state of an operating system executing on a central processing unit (CPU), and offloading resource-related tasks, based on the configuration state, to a resource management unit such as a system-on-chip (SoC). The resource management unit identifies a status of each resource based on the captured configuration state of the operating system. The resource management unit then processes tasks associated with the status of the resources, such as modifying a clock rate of a clocked component in the computing system. This can alleviate the CPU from processing those tasks thereby improving overall computing system performance and dynamics.

20 Claims, 12 Drawing Sheets

Related U.S. Application Data continuation of application No. PCT/US2019/067543, filed on Dec. 19, 2019.

(51) Int. Cl.
  *G06F 9/445* (2018.01)
  *G06F 9/455* (2018.01)
  *G06F 9/54* (2006.01)

(52) U.S. Cl.
  CPC .......... *G06F 9/45558* (2013.01); *G06F 9/544* (2013.01); *G06F 2009/45591* (2013.01)

(56) References Cited

U.S. PATENT DOCUMENTS

| | | | |
|---|---|---|---|
| 7,282,966 | B2 | 10/2007 | Narendra |
| 7,421,533 | B2 | 9/2008 | Zimmer et al. |
| 7,661,007 | B2 | 2/2010 | Ho |
| 7,766,235 | B2 | 8/2010 | Miller |
| 8,312,461 | B2 | 11/2012 | Watkins |
| 8,364,857 | B2 | 1/2013 | Pyers et al. |
| 8,671,293 | B2 * | 3/2014 | Qi .............................. G06F 1/26 718/1 |
| 8,776,050 | B2 | 7/2014 | Plouffe et al. |
| 8,863,139 | B2 | 10/2014 | Kakeda et al. |
| 9,588,815 | B1 | 3/2017 | Mistry et al. |
| 9,590,639 | B2 | 3/2017 | Kawabe et al. |
| 9,633,233 | B2 | 4/2017 | Wu et al. |
| 9,740,696 | B2 | 8/2017 | Oztaskent et al. |
| 10,380,039 | B2 | 8/2019 | Cooray et al. |
| 10,790,984 | B1 | 9/2020 | Stiles |
| 10,817,333 | B2 | 10/2020 | Franciosi et al. |
| 11,068,273 | B2 | 7/2021 | Al Sheikh et al. |
| 11,068,591 | B2 | 7/2021 | Lundgren et al. |
| 11,138,019 | B1 | 10/2021 | Sastry et al. |
| 11,526,380 | B2 | 12/2022 | Levin et al. |
| 11,630,698 | B2 | 4/2023 | Levin et al. |
| 2005/0004929 | A1 | 1/2005 | Stephenson |
| 2005/0289262 | A1 | 12/2005 | Sutardja |
| 2006/0174344 | A1 | 8/2006 | Costea et al. |
| 2009/0044273 | A1 | 2/2009 | Zhou et al. |
| 2009/0049220 | A1 | 2/2009 | Conti et al. |
| 2012/0042375 | A1 | 2/2012 | Yoo |
| 2012/0047366 | A1 | 2/2012 | Yoo |
| 2012/0096292 | A1 | 4/2012 | Mekhiel |
| 2013/0205295 | A1 | 8/2013 | Ebcioglu et al. |
| 2013/0219380 | A1 | 8/2013 | Rogers et al. |
| 2013/0305009 | A1 | 11/2013 | Durant et al. |
| 2014/0123286 | A1 | 5/2014 | Fischer et al. |
| 2014/0215240 | A1 | 7/2014 | Herdrich et al. |
| 2014/0380003 | A1 | 12/2014 | Hsu et al. |
| 2015/0039855 | A1 | 2/2015 | Pechanek |
| 2015/0067238 | A1 | 3/2015 | Marcu et al. |
| 2015/0143175 | A1 | 5/2015 | Kidamura |
| 2015/0237058 | A1 | 8/2015 | Chritz et al. |
| 2016/0098560 | A1 | 4/2016 | Friedrichs et al. |
| 2017/0031698 | A1 | 2/2017 | Mathews et al. |
| 2017/0116413 | A1 | 4/2017 | Takacs et al. |
| 2017/0220268 | A1 | 8/2017 | Guha et al. |
| 2018/0004539 | A1 | 1/2018 | Liguori et al. |
| 2019/0005241 | A1 | 1/2019 | Boutnaru |
| 2021/0117544 | A1 | 4/2021 | Kurtz et al. |
| 2021/0191775 | A1 | 6/2021 | Levin et al. |
| 2021/0191776 | A1 | 6/2021 | Levin et al. |
| 2021/0192046 | A1 | 6/2021 | Levin et al. |

FOREIGN PATENT DOCUMENTS

| | | |
|---|---|---|
| CN | 108139910 | 6/2018 |
| JP | 2004126982 | 4/2004 |
| JP | 2011227598 | 11/2011 |
| JP | 5778807 | 9/2015 |
| TW | I486760 | 6/2015 |
| TW | I518504 | 1/2016 |
| TW | 201738802 | 11/2017 |
| WO | 2018005826 | 1/2018 |
| WO | 2021126216 | 6/2021 |
| WO | 2021126222 | 6/2021 |

OTHER PUBLICATIONS

"Foreign Office Action", EP Application No. 19839591.5, dated Jan. 4, 2023, 4 pages.

"Final Office Action", U.S. Appl. No. 16/904,145, dated Nov. 14, 2022, 22 pages.

"Notice of Allowance", U.S. Appl. No. 16/906,828, dated Dec. 2, 2022, 16 pages.

"Final Office Action", U.S. Appl. No. 16/904,145, dated Mar. 4, 2022, 21 pages.

"Final Office Action", U.S. Appl. No. 16/906,828, dated Mar. 9, 2022, 30 pages.

"Final Office Action", U.S. Appl. No. 16/912,419, dated May 27, 2022, 6 pages.

"Foreign Office Action", TW Application No. 109128890, dated Jun. 29, 2021, 9 pages.

"Foreign Office Action", TW Application No. 109128890, dated Dec. 24, 2021, 14 pages.

"International Preliminary Report on Patentability", Application No. PCT/US2019/067560, dated May 17, 2022, 7 pages.

"International Preliminary Report on Patentability", Application No. PCT/US2019/067543, dated May 17, 2022, 8 pages.

"International Preliminary Report on Patentability", Application No. PCT/US2019/067572, dated May 17, 2022, 9 pages.

"International Search Report and Written Opinion", Application No. PCT/US2019/067572, dated Aug. 21, 2020, 14 pages.

"International Search Report and Written Opinion", Application No. PCT/US2019/067560, dated Sep. 14, 2020, 12 pages.

"International Search Report and Written Opinion", Application No. PCT/US2019/067543, dated Sep. 14, 2020, 14 pages.

"Non-Final Office Action", U.S. Appl. No. 16/912,419, dated Feb. 22, 2022, 18 pages.

"Non-Final Office Action", U.S. Appl. No. 16/904,145, dated Jun. 30, 2022, 19 pages.

"Non-Final Office Action", U.S. Appl. No. 16/906,828, dated Sep. 27, 2021, 29 pages.

"Non-Final Office Action", U.S. Appl. No. 16/904,145, dated Nov. 23, 2021, 22 pages.

"Notice of Allowance", U.S. Appl. No. 16/912,419, dated Aug. 11, 2022, 5 pages.

Basehore, et al., "Fast Adaptive Voltage and Boost Frequencies for Central Processing Units", Technical Disclosure Commons; Retrieved from https://www.tdcommons.org/dpubs_series/2651, Nov. 5, 2019, 9 pages.

Buchanan, et al., "Return-Oriented Programming: Exploits Without Code Injection", Retrieved from https://hovav.net/ucsd/talks/blackhat08.html, Aug. 2008, 1 page.

Buchanan, et al., "When Good Instructions Go Bad: Generalizing Return-Oriented Programming to RISC", Retrieved from https://hovav.net/ucsd/dist/sparc.pdf, Oct. 2008, 12 pages.

Checkoway, et al., "Return-Oriented Programming without Returns", Retrieved from https://hovav.net/ucsd/dist/noret-ccs.pdf, Oct. 2010, 14 pages.

Demme, et al., "On the Feasibility of Online Malware Detection with Performance Counters", Department of Computer Science, Columbia University, NY, NY 10027, 2013, 12 pages.

Hillenbrand, et al., "Reconciling Application Power Control and Operating Systems for Optimal Power and Performance", Jul. 2013, 8 pages.

Levin, "Return-Oriented Programming Detection and Prevention Utilizing a Hardware and Software Adaptation", Technical Disclosure Commons; Retrieved from https://www.tdcommons.org/dpubs_series/2808, Dec. 20, 2019, 9 pages.

Shacham, "The Geometry of Innocent Flesh on the Bone: Return-into-libc without Function Calls (on the x86)", Retrieved from https://hovav.net/ucsd/dist/geometry.pdf, Oct. 2007, 30 pages.

(56) References Cited

OTHER PUBLICATIONS

Yoshida, et al., "FoxLargo: Slowing Down CPU Speed with a Virtual Machine Monitor for Embedded Time-Sensitive Software Testing", Jan. 2008, 13 pages.
"Foreign Office Action", TW Application No. 111133646, dated Apr. 6, 2023, 10 pages.
"Foreign Office Action", EP Application No. 19839591.5, dated Jun. 29, 2023, 4 pages.

* cited by examiner

RESOURCE MANAGEMENT UNIT FOR CAPTURING OPERATING SYSTEM CONFIGURATION STATES AND OFFLOADING TASKS

RELATED APPLICATIONS

This application is a continuation of and claims priority to U.S. patent application Ser. No. 16/912,419, filed on Jun. 25, 2020, which in turn is a continuation of and claims priority to International Patent Application Serial No. PCT/US2019/067543, filed on Dec. 19, 2019, the disclosures of which are incorporated in their entireties by reference herein.

BACKGROUND

Computer systems generally include a central processing unit (CPU), memory, input/output (I/O) devices, and other electronic components, as well as software, firmware, and data. Operating system (OS) software stored in memory and executed on the CPU manages the computer system's core functions, such as scheduling tasks, executing software applications, managing memory, and controlling I/O and peripheral devices. Additional hardware or other integrated circuit components, such as a memory management unit (MMU), may be included on a motherboard to offload processing tasks from the CPU in effort to improve performance of the system. These efforts to improve performance of the system with additional hardware or other components, however, often fail to effectively or sufficiently improve system performance.

SUMMARY

This document describes an example computing system and method that leverages a resource management unit to capture a configuration state of an operating system (OS) executing on a central processing unit (CPU) and offload tasks from the CPU based on the configuration state of the operating system. The resource management unit identifies a status of resources in the computing system based on the configuration state of the operating system, then processes tasks associated with the status of the resources. The resource management unit processes tasks with reduced limitations relative to standard additional hardware blocks because the resource management unit is aware of the configuration state of the operating system. Based on this configuration state, the resource management unit determines which processing tasks can be performed in the computing system. The resource management unit then performs a processing task independent of the operating system (which is executing on the CPU). By so doing, the resource management unit alleviates the CPU from processing that task, which in turn can improve overall performance of the computing system.

In one aspect, operating system configuration states are captured by the resource management unit for dynamically scaling clock rates of clocked components. Based on the operating system configuration state, a resource status is identified for which the computing system would benefit from scaling the clock rate of a clocked component. Enabling the resource management unit, rather than the CPU, to dynamically scale clock rates in the system responsive to operating system configuration states enables more-responsive and relevant scaling to active events. It can also reduce waste of CPU resources on clock-rate scaling tasks, thereby permitting the CPU to address other operations.

The details of one or more methods, devices, systems, and procedures for capturing operating system configuration states for offloading tasks to a resource management unit and dynamically scaling clock rates are set forth in the accompanying drawings and the following description. Other features and advantages will be apparent from the description, drawings, and claims. This summary is provided to introduce subject matter that is further described in the detailed description and drawings. Accordingly, this summary should not be considered to limit the scope of the claimed subject matter.

BRIEF DESCRIPTION OF THE DRAWINGS

The details of one or more aspects of a resource management unit for capturing operating system configuration states for offloading tasks are described with reference to the following drawings. The use of the same reference numbers in different instances in the description and the figures may indicate like elements.

DETAILED DESCRIPTION

Figure 1:
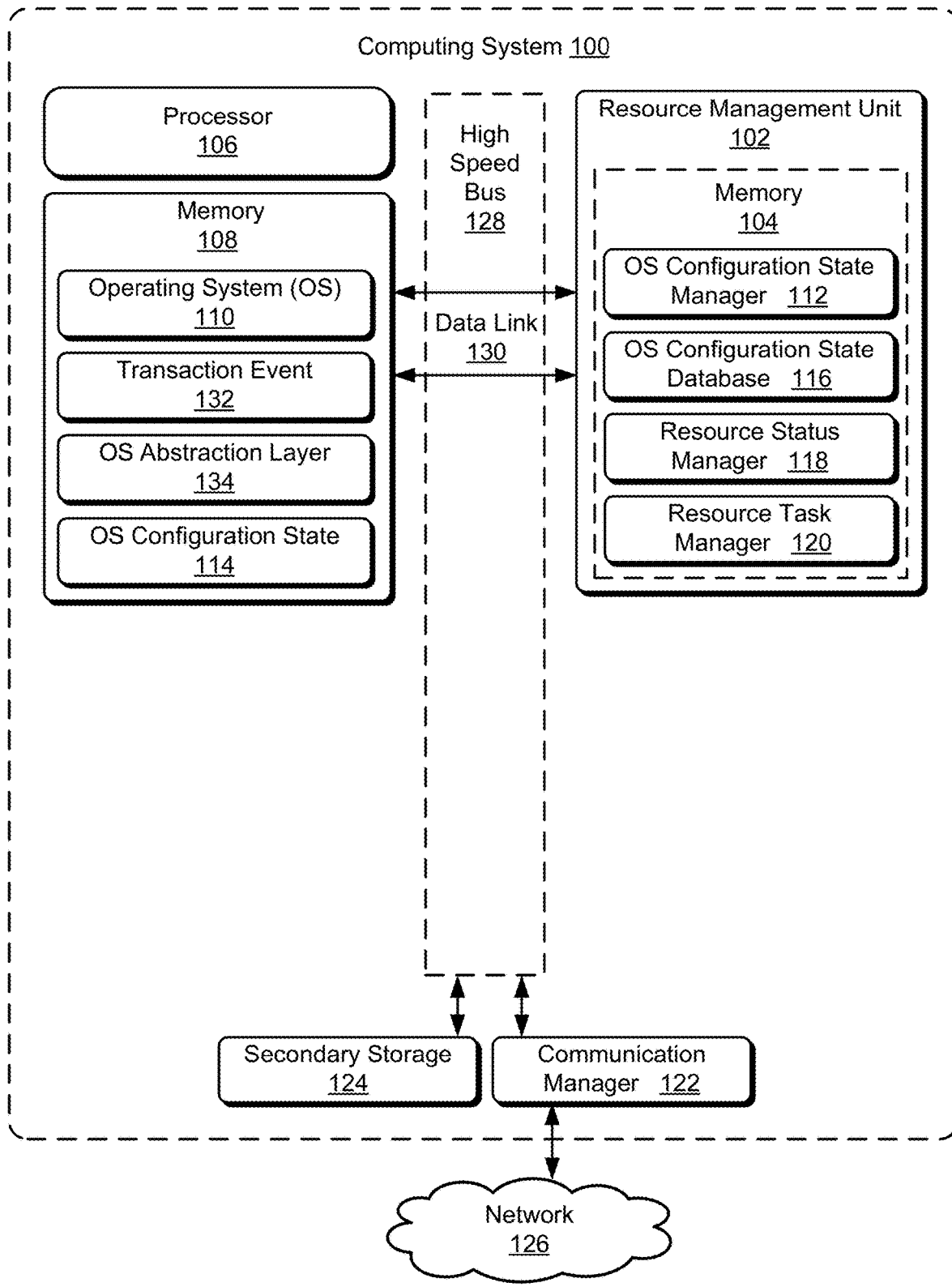
FIG. 1 is a block diagram illustrating an example computing system configured to capture operating system configuration states for offloading tasks to a resource management unit (e.g., scaling clock rates, memory management, processing, managing vulnerabilities).

This disclosure describes methods and systems for capturing operating system configuration states to offload tasks to a resource management unit. A computing system leverages a resource management unit, such as a system-on-chip (SoC), to capture a configuration state of an operating system (OS) executing on a central processing unit (CPU) of the computing system. The resource management unit identifies a status of resources in the computing system based on the configuration state of the operating system. The resource management unit then processes tasks associated with the status of the resources to alleviate the CPU from processing the tasks, thus improving overall computing system performance. In one example, the resource management unit identifies a process resource in the computing system and dynamically scales a clock rate of a clocked component of that resource, such as a processor or memory, to improve system performance. Example performance improvements include power optimization, thermal dynamic response improvement, or reduced processing time.

This disclosure generally describes capturing an operating system configuration state with a resource management unit and, based on the captured state, offloading tasks. Various ways in which to offload tasks are described, including processing tasks, memory management, malware and vulnerability management, and dynamically scaling clock rates. While these examples are described in subsections below, these subsections are not intended to limit these examples to being only described in those subsections, their coexistence with other examples, or their independent operation.

Capturing Operating System Configuration Stapes and Offloading Tasks to a Resource Management Unit Hardware components of a computer system are often configured to assist an operating system or CPU with processing tasks. These processing tasks, however, remain managed by the operating system, which is executed through the CPU. Further, these components impose their own limitations on the operating system and CPU, such as application programming interfaces (APIs) in the form of cyclic buffers, memory mapped input/output (MMIO), shared-memory limitations, and sizing restrictions for swapping memory pages or I/O blocks. These limitations continue to burden the CPU, often causing delay or reduced performance of the computing system, even from a user's perspective. For example, as the operating system manages the system's resources, such as scheduling tasks, pausing execution of a process, allocating memory, swapping memory, starting execution of another process, and so forth, a user's input or expected output in response to that input may be delayed. This may occur even if some of these functions are assigned to, and completed with the help of, additional hardware because the operating system remains responsible for assigning the tasks or executing certain functions related to these hardware components through the CPU, thus burdening the CPU.

In contrast, the resource management unit of this disclosure avoids these limitations by capturing the operating system configuration state, storing it into a database (e.g., memory) associated with or accessible by the resource management unit, identifying from the database a status of resources in the system, and independently processing tasks associated with the resources. This independent processing by the resource management unit effectively alleviates the processor from having to perform the tasks thus improving overall system performance.

Although the described resource management unit can be an SoC, other hardware configurations may similarly be used, either alone or in combination with firmware or software, that provides comparable functionality to the resource management unit of this disclosure.

FIG. 1 is a block diagram illustrating an example computing system 100 having a resource management unit 102, e.g., a system-on-chip (SoC) and associated memory 104, as well as a processor 106 (e.g., the CPU) and its associated memory 108. The memory 104 and 108 are computer-readable storage media, and can include various implementations of random-access memory (RAM), read-only memory (ROM), flash memory, cache memory, and other types of storage memory in various memory device configurations, including a shared memory configuration. The memory 108 includes the operating system 110 and instructions that execute on the processor 106.

The resource management unit 102 includes an OS configuration state manager 112 configured to capture or obtain (used interchangeably herein) an OS configuration state 114 of the operating system 110. The OS configuration state 114 reflects a momentary state or status of the operating system at a given point in time. As an example, and for simplicity of this discussion, the OS configuration state 114 reflects a status of the operating system upon a resource transaction event 132 occurring in the operating system 110. However, other events or times may similarly be selected to capture the OS configuration state.

The OS configuration state manager 112 captures and stores the OS configuration state 114 into an OS configuration state database (database) 116. The database 116 may be located in the memory 104 or any other fast memory associated with the resource management unit 102, either fabricated on or as part of the resource management unit or located elsewhere in the computing system 100 and accessible by the resource management unit 102 via low-latency access. The OS configuration state database 116 may be any standard database structure, such as a table, tree, hierarchical, relational (e.g., MySQL, SQLite, Oracle, Sybase), NoSQL or object-oriented scheme, configured to capture indicators of the operating system configuration state as described in this disclosure.

The OS configuration state 114 captured into the OS configuration state database 116 may include information associated with a process run queue, a process wait queue, active devices, and virtual memory tables. These queues include process data relevant to specific processes in each queue. The process data includes data defining the status of that process as stored in a data structure, such as a process control block or similar structure, as described further below for defining and tracking processes and activity in operating systems. The virtual memory tables define the storage allocation scheme in which a secondary storage 124 (e.g., memory) can be addressed as though it were part of the memory 108. Other example aspects of the operating system captured may include process priority data, process run-time remaining, resource scheduling data, resource usage data, memory usage data, memory mapping data, storage management data, active device data, a hypervisor status, a virtual machine (VM) status, a VM guest operating system status, or resources used by the hypervisor or virtual machine. Additional operating system aspects captured may be similar to those identified using an operating system analysis tool, such as a Linux operating system event-oriented observability tool, e.g., "perf." This allows for tracking performance counters, events, trace points, tasks, workload, control-flow, cache misses, page faults, and other profiling aspects of the operating system to provide a robust reference perspective of the operating system configuration state.

For purposes of this disclosure, a process is an instance of a program (e.g., binary program file) in execution on a processor 106 (or a core or cores of the processor). A process may be defined by how it is referenced in memory. Examples of a process definition in memory may include elements of text (e.g., compiled program code), data (e.g., global and static variables), heap (e.g., for dynamic memory allocation), stack (e.g., local variables), and information related to program counters and registers. A state of a process (process state) in the operating system may include: (i) a new process being created, (ii) a ready process that has its resources ready but not yet running on the processor, (iii) a running process that is being executed by the processor, (iv) a waiting process that is not running but is waiting for an event to occur or resource to become available, and (v) a terminated process that has completed execution on the processor. Additionally, for each process there is a data structure, referenced as a process control block in this disclosure (e.g., see FIG. 6), that stores the process-specific information. The process control block may include data indicative of: (i) the process identification (ID), (ii) the process state, (iii) processor registers and program counter (e.g., for swapping the process in and out of the processor), (iv) processor scheduling information (e.g., priority information), (v) memory management data (e.g., page tables), (vi) accounting data (e.g., processor time consumed, limits), and (vii) input/output status data (e.g., devices used, open files).

The resource management unit 102 further includes a resource status manager 118 and a resource task manager 120. The resource status manager 118 identifies a status of a resource in the computing system, as stored in the database 116, based on the OS configuration state 114. For example, a status of a process is detected by referencing the process control block of that process, thereby detecting the process state, registers, scheduling, priority, memory management, and other process-related information. The resource task manager 120 processes a task associated with the status of the resource, as identified by the resource status manager 118, to alleviate the processor 106 from performing the task and thereby improving overall performance of the computing system 100. For example, if the process control block indicates a process is in a waiting state and a memory resource is needed, the resource task manager 120 processes a task of freeing memory so the process may move from the wait state to the ready state for execution. Although the OS configuration state manager 112, resource status manager 118, and resource task manager 120 are shown in the diagram as being stored as executable instructions (e.g., firmware or software) in the memory 104, the same may alternatively be formed in digital logic hardware blocks on the resource management unit 102, or enabled using a combination of firmware, software, and hardware blocks.

A communication manager 122 enables communications external to the computing system 100, such as to a networked computing environment, the Internet, or a cloud or multi-cloud network computing environment, generally referred to herein as a network 126. The resource management unit 102 and processor 106 together form a processor complex in the computing system 100, and the memory 104, 108 include data or instructions stored thereon to cause the processor complex 102, 106 to perform the methods and functions described throughout this document.

A secondary storage 124 provides additional storage (e.g., memory) functionality for the computing system 100. Examples of the secondary storage 124 include non-volatile memory, fixed and removable media devices, and any suitable memory device or electronic data storage that maintains executable instructions and/or supporting data. The secondary storage 124 can include various implementations of RAM, ROM, or other types of non-volatile memory such as a solid-state drive (SSD) or a hard disk drive (HDD), or combinations thereof. The secondary storage 124 may be used for storing software applications or data, or for memory management purposes.

Figure 3:
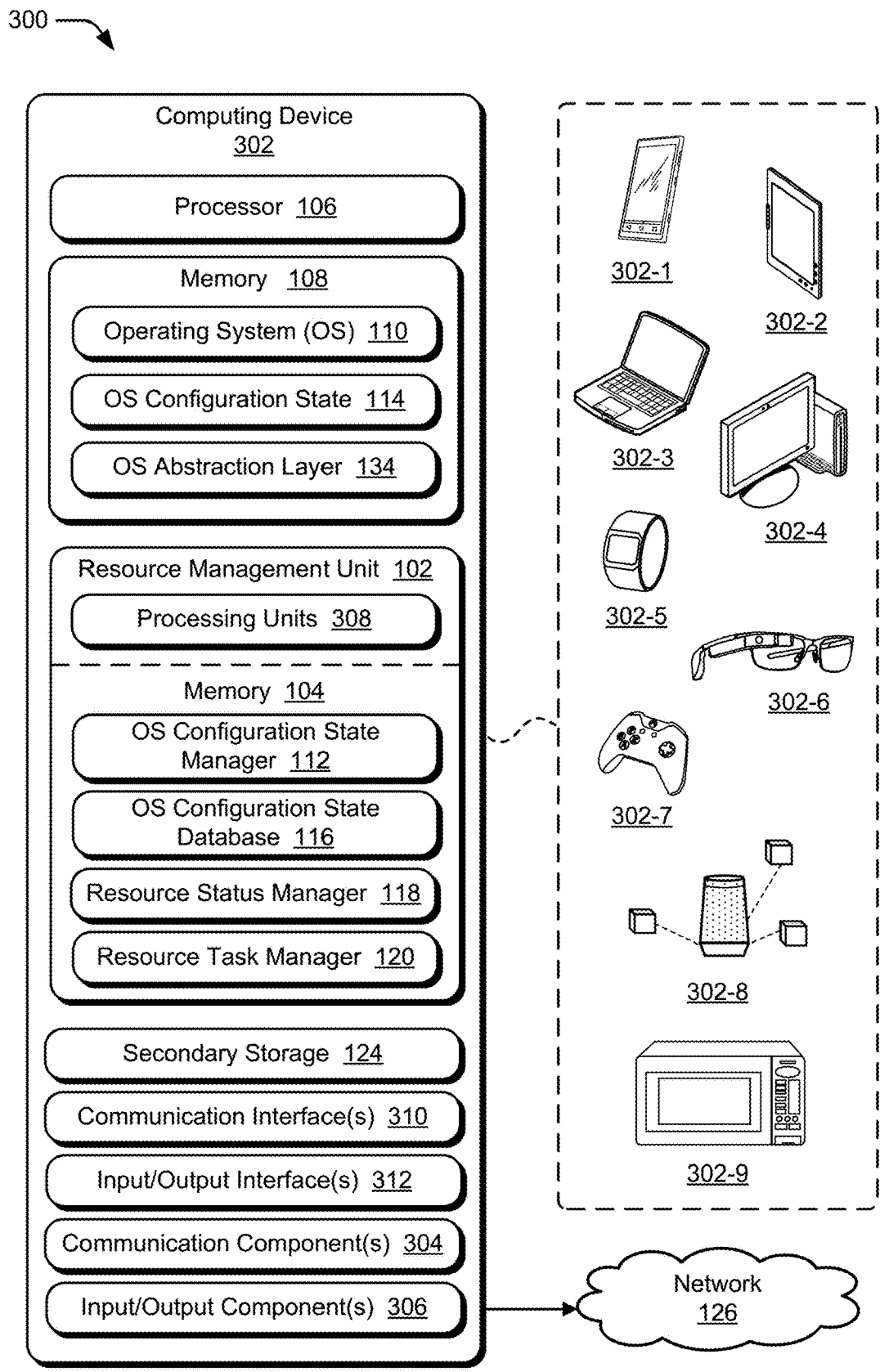
FIG. 3 illustrates an example device diagram for a user equipment that can implement various aspects of capturing operating system configuration states for offloading tasks to a resource management unit.

The resource management unit 102 may include other components not shown in this example, such as processing units (e.g., central processing units, graphics processing units, artificial intelligence processing units, display processors, video processors), communication units (e.g., modems), input/output controllers, and sensor hubs (see FIG. 3 for additional examples).

The resource management unit 102 and the processor 106 communicate using low-latency communication and write transactions, either by way of the resource management unit being implemented on a same integrated circuit die as the processor and its memory 108, or by using a high-speed interface bus 128 and data link 130. The high-speed bus 128 may be any fast bus standard that creates a seamless interface between the resource management unit 102 and the processor 106, such as the Peripheral Component Interconnect Express bus, otherwise known as PCI Express or PCIe, or other similar open or proprietary bus standard with low-latency performance. The resource management unit 102 may also have a direct memory access (DMA) channel to the memory 108 via the data link 130 for transferring data to/from the memory 108 without passing it through the processor 106.

In one example, capturing an OS configuration state 114 of the operating system 110, in coordination with the OS configuration state manager 112 on the resource management unit 102, includes detecting resource transaction events 132 indicative of operational status information of the operating system and its managed resources. Examples of resource transaction events include events regarding a process run queue, a process wait queue, process priority data, process run-time remaining, resource scheduling data, resource usage data, active device data, memory usage data, memory mapping data, virtual memory tables, storage management data, a hypervisor status, a virtual machine (VM) status, a VM guest operating system, or resources used by the hypervisor or virtual machine.

In one example, a resource transaction event 132 is detected and the OS configuration state 114 is captured by using an OS abstraction layer of instructions 134. These instructions 134 are executed by the processor 106 to push the OS configuration state to the resource management unit 102. Alternatively, or in combination with the abstraction layer, the OS configuration state manager 112 on the resource management unit 102 is configured to capture or pull the OS configuration state 114 upon detecting resource transaction events 132. In some cases these resource transaction events 132 are detected through monitoring write transactions to the high-speed bus 128 interface and data link 130, such as through API queues and interrupt lines.

The OS configuration state 114, captured via the OS configuration state manager 112 in the resource management unit 102, is stored in the OS configuration state database 116 associated with the resource management unit memory 104 so that the resource status manager 118 may identify a status of any particular resource by accessing the database. Examples of resources for which a status may be identified include a process run queue, process wait queue, process priority data, process run-time remaining, resource scheduling data, active device data, memory usage data, memory mapping data, virtual memory tables, storage management data, a hypervisor, a virtual machine (VM), a VM guest operating system, and resources used by the hypervisor or virtual machine.

Based on an understanding of the OS configuration state database 116 and its depiction of operating system resources, the resource management unit resource task manager 120 processes a task associated with the status of a resource. The resource management unit 102 identifies and acts on a resource task in advance of what the processor 106 may identify and process. The resource management unit can increase processing priority or performance factors for a specific task, or address a security aspect of the computing system relative to a particular process, or process an overhead management activity of the computing system. All these aspects can result in improved overall system performance and also an improved user's perception of responsive processing. This reduced latency, both real and as perceived by a user, is enabled because the processor 106 can focus on user-perceivable activities or other priorities while the resource management unit performs overhead system management work and other processing tasks.

Figure 2:
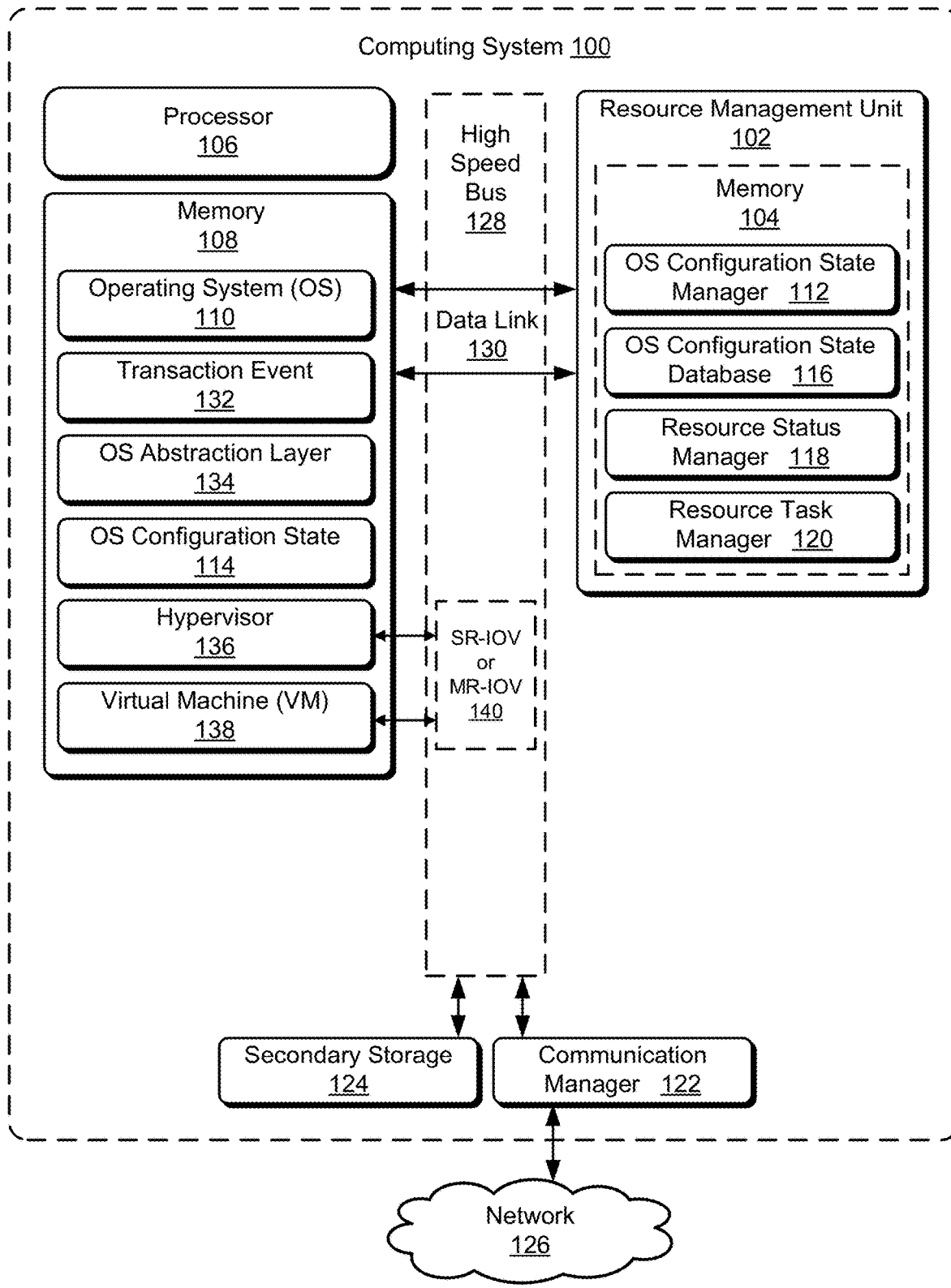
FIG. 2 is a block diagram illustrating another example computing system, including a hypervisor and virtual machine, configured to capture operating system configuration states for offloading tasks to a resource management unit.

FIG. 2 is a block diagram illustrating another example of a computing system 100 generally including the resource management unit 102, operating system 110, memory 108, and processor 106. However, in this example the computing system 100 is configured with a hypervisor 136 and virtual machine 138 running a guest operating system. Although only one virtual machine is depicted, the computing system 100 may include multiple virtual machines and/or guest operating systems as managed by the hypervisor 136.

The components, functionality, and methods previously discussed with respect to FIG. 1 perform similarly for managing the hypervisor and virtual machine components included in FIG. 2. For example, the OS configuration state manager 112 of the resource management unit 102 stores the OS configuration state 114 into an OS configuration state database 116. The OS configuration state 114, however, may include operating system aspects relating to the hypervisor 136 and virtual machine 138. The resource status manager 118 again identifies a status of a resource in the computing system, as stored in the database 116 based on the configuration state 114 of the operating system 110, hypervisor 136, and virtual machine(s) 138. The resource task manager 120 processes a task associated with the status of the resource, as identified by the resource status manager 118, to alleviate the processor 106 from performing the task, thus improving overall performance of the computing system.

Similar to the aspects discussed in reference to FIG. 1, capturing the OS configuration state 114 of the operating system 110, the hypervisor 136, and the virtual machine 138, includes obtaining operational status information of the operating system and its managed resources. This information may be obtained by monitoring and detecting the OS resource transaction events 132. Such information may be captured by the resource management unit 102 by using virtualization technologies 140, such as single root input/output virtualization (SR-IOV) or multi-root input/output virtualization (MR-IOV), to allow isolation of the bus (e.g., PCIe) by the hypervisor or virtual machine for manageability and performance. Example operational status information of the managed resources may relate to a process run queue, a process wait queue, process priority data, process run-time remaining, resource scheduling data, resource usage data, active device data, memory usage data, memory mapping data, virtual memory tables, storage management data, a hypervisor, a virtual machine, a virtual machine guest operating system, or resources used by the hypervisor or virtual machine.

FIG. 3 is a conceptual diagram illustrating an example computing system 300 as, or integrated into, a computing device 302 configured with components and functionality for capturing OS configuration states for offloading tasks to a resource management unit (e.g., a resource management unit 102). The computing device 302 is an example computing environment or application for the computing system 100 of FIG. 1. As some non-limiting examples, the computing device 302 may be a mobile phone 302-1, a tablet device 302-2, a laptop computer 302-3, a television/display or desktop or server computer 302-4, a computerized watch 302-5, or other wearable device 302-6, a game controller 302-7, a networked multimedia or voice assistant system 302-8, or an appliance 302-9.

The computing device 302 includes the resource management unit 102, the memory 104, and the OS configuration state manager 112 configured to capture or obtain the OS configuration state 114 of the operating system 110 stored in the memory 108 and executing on the processor 106. The OS configuration state manager 112 of the resource management unit 102 stores the OS configuration state 114 into an OS configuration state database 116 associated with the resource management unit 102. The resource status manager 118 identifies a status of a resource in the computing device, as stored in the database 116 based on the OS configuration state 114. The resource task manager 120 processes a task associated with the status of the resource, as identified by the resource status manager 118, to alleviate the processor 106 from performing the task and thereby improving overall performance of the computing device.

The computing device 302 also includes communication components 304, input/output components 306, communication interfaces 310, and input/output interfaces 312. These interfaces and components may leverage the memory 108 and processor 106, and/or be incorporated into the resource management unit 102 to leverage its operations.

The resource management unit 102 may also include processing units 308. The processing units 308 process computer-executable instructions to perform operations and execute functions of the computing device 302. The processing units 308 may include any combination of controllers, microcontrollers, processors, microprocessors, hardware processors, hardware processing units, digital-signal-processors, graphics processors, graphics processing units, video processors, video processing units, and the like.

The memory 104 associated with the resource management unit 102, and the memory 108, store information and instructions that are executed by the processor 106 and/or processing units 308 to perform operations and execute functions. These memories are configured to provide the computing device 302 with persistent and/or non-persistent storage of executable instructions (e.g., firmware, recovery firmware, software, applications, modules, programs, functions, and the like) and data (e.g., user data, operational data, scan results) to support execution of the executable instructions. Examples of these memories include volatile memory and non-volatile memory, fixed and removable media devices, and any suitable memory device or electronic data storage that maintains executable instructions and supporting data. These memories can include various implementations of RAM, ROM, flash memory, cache memory, and other types of storage memory in various memory device configurations, or may be a solid-state drive (SSD), a hard disk drive (HDD), or combination thereof. These memories exclude propagating signals.

The communication components 304 enable wired and/or wireless communication of device data between the computing device 302 and other devices, computing systems, and network 126. The communication components 304 can include receivers, transmitters, and transceivers for various types of wired and wireless communications. Communication interfaces 310 handle messaging and protocols associated with communications being transmitted and received using the communication components 304.

The input/output components 306 provide connectivity to the computing device 302. For example, the input/output components 306 may include a user interface device that manages a user interface of the computing device 302, or may provide additional connectivity, beyond just the user interface device. The input/output components 306 can also include data interfaces or data input ports for receiving data, including user inputs. The processor 106 and/or processing units 308 may tailor operations according to input information obtained by the input/output interfaces 312 from the input/output components 306. Likewise, based on information obtained by the communication interfaces 310 from the communication components 304, the processor 106 and/or processing units 308 tailor operations according to incoming or outgoing communications.

Figure 4:
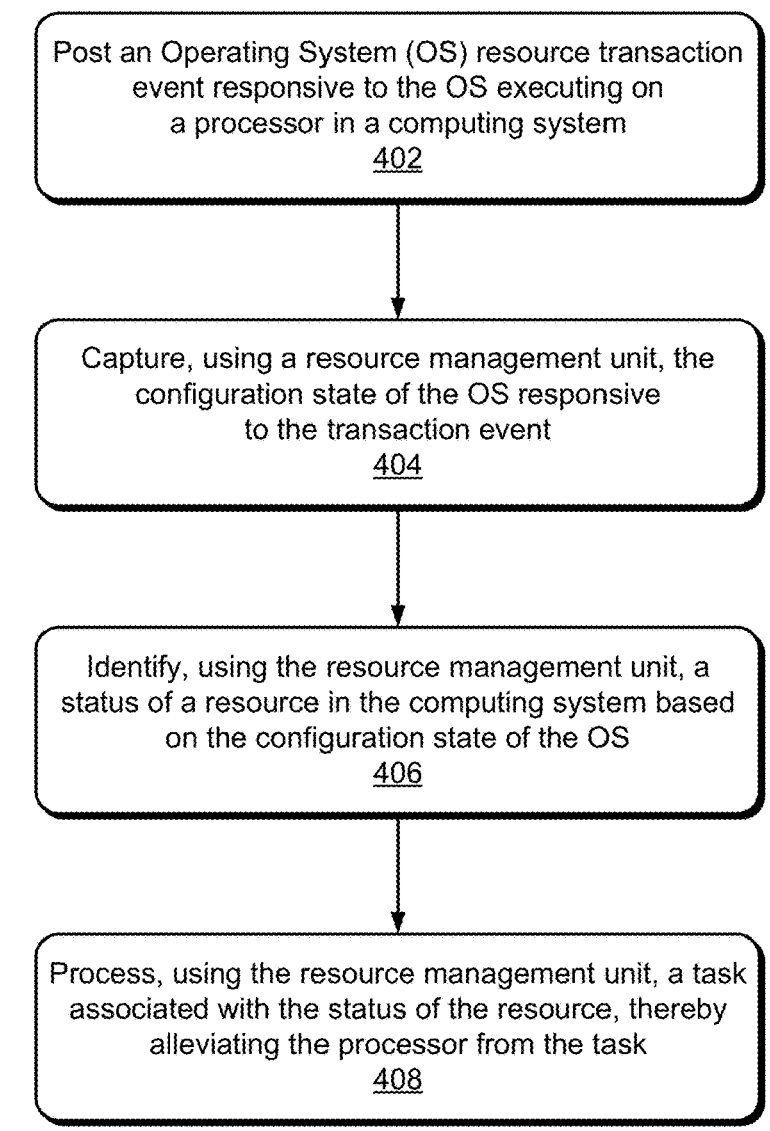
FIG. 4 illustrates an example method for capturing operating system configuration states for offloading tasks to a resource management unit in a computing system.
Figure 5:
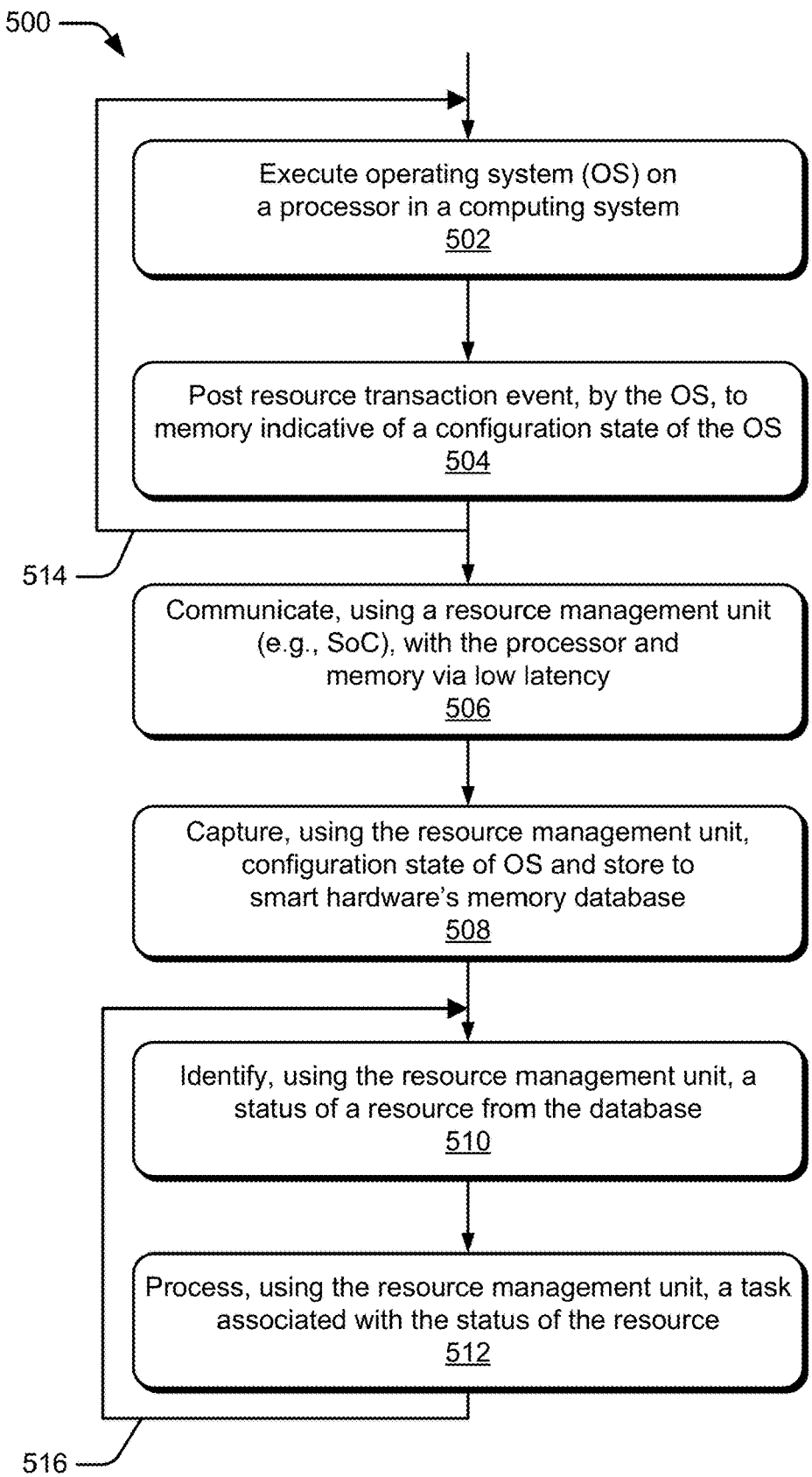
FIG. 5 illustrates an example method with additional detail for capturing operating system configuration states for offloading tasks to a resource management unit in a computing system.

FIGS. 4-5 are flow diagrams 400, 500 illustrating high-level operations of example methods for capturing operating system configuration states in a computing system for off-loading tasks to a resource management unit. The operations of methods 400, 500, and other methods described herein, may be embodied as programming instructions stored on a non-transitory, machine-readable (e.g., computer/processor-readable) medium, such as a RAM or ROM memory or other storage device for execution in a computing device or devices, or may be performed by hardware blocks, or combinations thereof. In some examples, implementing the operations of the methods can be achieved by a processor complex, including a main processor and a resource management unit, reading and executing the programming instructions stored in the memory, and/or functioning in combination with hardware blocks of the resource management unit. In some examples, implementing the operations of the methods can be achieved using a resource management unit such as a system-on-chip (SoC), and/or other hardware components either alone or in combination with programming instructions executable by a processor or processors in a computing device.

The example methods described in this disclosure may include more than one implementation, and different implementations of the methods may not employ every operation presented in the respective flow diagrams, or may employ additional operations not shown. Therefore, while the operations of the methods are presented in a particular order within the flow diagram(s), the order of their presentations is not intended to be a limitation as to the order in which the operations may actually be implemented, or as to whether all of the operations may be implemented. For example, one implementation of the methods might be achieved through the performance of a number of initial operations, without performing subsequent operations, while another implementation of the methods might be achieved through the performance of all of the operations.

Referring now to example method 400 of FIG. 4, a first operation 402 includes posting an operating system resource transaction event in a memory of a computing system responsive to the operating system executing on a processor in the computing system. An operating system transaction event is indicative of when a configuration state of the operating system may be captured because an operating system event is occurring or has occurred. Capturing a configuration state of the operating system includes obtaining operational status information of the operating system and its managed resources. Examples of such resources and operating system operational status information include a process run queue, a process wait queue, process priority data, process run-time remaining, resource scheduling data, resource usage data, active device data, memory usage data, memory mapping data, virtual memory tables, storage management data, hypervisor activity, virtual machine activity, virtual machine guest operating system activity, and other related process and system activities, statuses, and data.

At 404, a resource management unit, such as an SoC, obtains the configuration state of the operating system and stores it in a database (e.g., memory) associated with the resource management unit. For example, the resource management unit 102 described above obtains the configuration state by communicating with the processor and memory using low-latency communication and read/write transactions, either by way of the resource management unit being implemented on a same integrated circuit die as the processor and its memory, or by using a high-speed interface bus and data link. The resource management unit may also have a direct memory access (DMA) channel to the memory for transferring data to/from memory without passing it through the processor in the computing system.

At 406, the resource management unit identifies a status of a resource in the computing system based on the operating system configuration state stored in the database, and identifies a task to be performed that is associated with the resource. For example, a status of a process resource in the process run-queue may be identified as a process that is next up for execution time on the processor, and that a memory resource of some number of bytes is needed for the process to execute. As another example, a status of a process resource in the process wait-queue may be identified as one that is waiting for a resource-related event to occur. An example event may be that the process needs a virtual file system (VFS) inode describing a directory in the file system, but that inode may not be in the cache. Because of this, the process must wait for that inode to be fetched from the physical media containing the file system before it can continue executing.

At 408, the resource management unit processes the task associated with the status of the resource to alleviate the processor from performing that task and to improve the performance of the computing system. For example, in the context described above (that of a task needing a memory resource of some number of bytes of memory), the resource management unit may execute the task of making that memory resource available, such as by swapping out memory, so that sufficient memory is available when the process is actually executed again on the processor. As another example, in the context described above regarding the wait-queue waiting for an inode to be fetched, the resource management unit may execute the task to fetch the inode in advance of when the operating system and processor may be able to do it. This allows processes to avoid waiting to execute relative to if they had waited for the processor (not the resource management unit device's processor) to fetch the inode. Other examples include the resource management unit modifying processing priority or performance factors for a specific process, addressing a security aspect of the computing system relative to a particular process, and processing other overhead management activities of the computing system.

Referring now to FIG. 5, example method 500 depicts additional details for capturing operating system configuration states for offloading tasks to a resource management unit in a computing system. At 502, an operating system stored in a memory executes on a processor in a computing system. At 504, during execution of operating system instructions, the operating system posts a resource transaction event to memory indicative of a resource event occurring and a new configuration state of the operating system. As an example, an abstraction layer of the operating system software posts resource transaction event data indicative of, for example, a process execution status, resource usage and scheduling, memory usage and mapping, hypervisor status, virtual-machine status, and/or any other transaction event that the operating system is managing for the computing system.

At 506, a resource management unit communicates with the processor and memory via a low-latency communication data link. Such low-latency communication data link may be a high-speed bus (e.g., PCIe) or via cache if the resource management unit is implemented on a same integrated circuit die as the processor. At 508 the resource management unit obtains (e.g., captures) the configuration state of the operating system and stores it to a database associated with the resource management unit. Note that after a transaction event is posted 504, a return execution flow arrow 514 in the diagram illustrates that the operating system continues executing on the processor 502, even while the resource management unit communicates 506 with the memory and processor. This allows the operating system to continue performing its operations, even while the resource management unit is performing its functions 508, 510, 512, for overall improved system performance.

At 510, the resource management unit identifies a status of a resource from the database based on the configuration state of the operating system. For example, a status of a resource may be identified as a process that needs additional time to execute, or a process that will need to access certain I/O resources that need to be retrieved from storage, or a process that may pose a security issue if executed, or a process or system that may benefit from modifying a clock rate/signal frequency for a clocked component.

At 512, the resource management unit processes a task associated with the status of the resource. For example, memory is swapped in advance so the process waiting next in queue has sufficient memory available when it begins to execute on the processor as described above, or a resource is fetched as described above, or additional memory is allocated for the process waiting next in queue, or a potential security issue is resolved concerning a process, or a component signal frequency is adjusted to meet processing demands. This awareness of a resource status enables the resource management unit to act on a task in advance of when the processor or operating system may eventually perform the task.

After the task is processed for the resource at 512, execution control returns, at 516, to allow the resource management unit to identify 510 a status of a next resource from the database as needed, and process another task 512 that is associated with that next resource. This processing is repeated as needed for resources identified in the database. As this resource status identification 510 and task processing 512 is performed by the resource management unit, the operating system continues executing 502 and posting resource transaction events 504, and the resource management unit continues communicating 506 with the processor and memory and capturing 508 a configuration state of the operating system and storing it in the database. This example method of capturing operating system configuration states for offloading tasks from a processor in a computing system to a resource management unit provides overall improved computing system performance.

Figure 6:
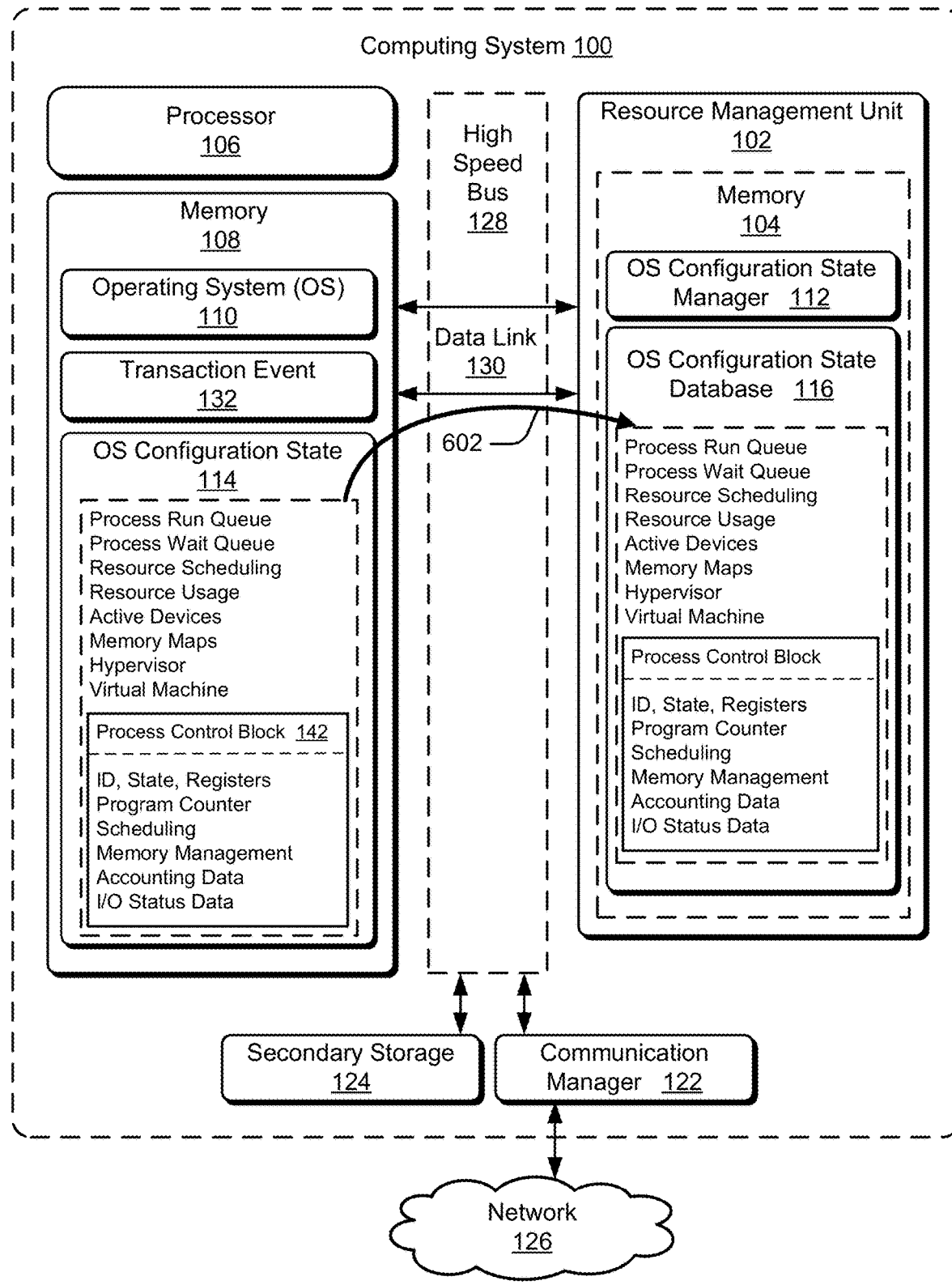
FIG. 6 is a block diagram illustrating an example computing system depicting an example operating system configuration state as captured by a resource management unit for offloading operating system tasks to the resource management unit.

FIG. 6 is a block diagram illustrating an example OS configuration state 114 in a memory 108 of a computing system 100 as captured by a resource management unit 102 into a memory 104 and a database 116. Similar to the discussion with respect to FIGS. 1-3, the computing system 100 generally includes the resource management unit 102, the memory 108, the operating system 110, and the main processor 106. This example depicts operational status information in the memory 108 for exemplary resources as indicative of the OS configuration state 114 at a time that a resource transaction event is detected (e.g., the resource transaction event 132). In this example, OS configuration state 114 also depicts a process control block 142 representative of a status of an example process in the process run queue or wait queue as described above in reference to FIG. 1. Although only a single process control block is depicted, a process control block exists for each process in the process run queue and wait queue. Upon detecting the resource transaction event 132, the OS configuration state 114 is copied 602 (pushed or pulled) into the OS configuration state database 116 on the resource management unit 102. Although the diagram illustrates an example OS configuration state identifying a number of example resources, other operating system configuration state resources, resource references, or status indicators may similarly be referenced, identified, and captured by the resource management unit 102 into the database 116 in coordination with the OS configuration state manager 112.

With the database 116 having the OS configuration state 114, the resource management unit 102 may then process a task associated with a status of any given resource identified in the database to improve the performance of the computing system. For example, the resource management unit 102 may increase processing priority or performance criteria for a specific process, or address a security aspect of the computing system relative to a particular process, or process an overhead management activity of the computing system, or modify a signal frequency of a clocked component. An example of processing an overhead management activity, such as memory allocation or data fetch, is described above in reference to FIG. 4 and further below in reference to FIG. 9. Having the resource management unit process each of these tasks results in improved overall system performance and may also improve a user's perception of responsive processing in the computing system because the processor 106 can focus on user perceivable activities or other needed activities while the resource management unit 102 performs the overhead system management work.

Dynamically Scaling Clock Rates with a Resource Management Unit

Figure 7:
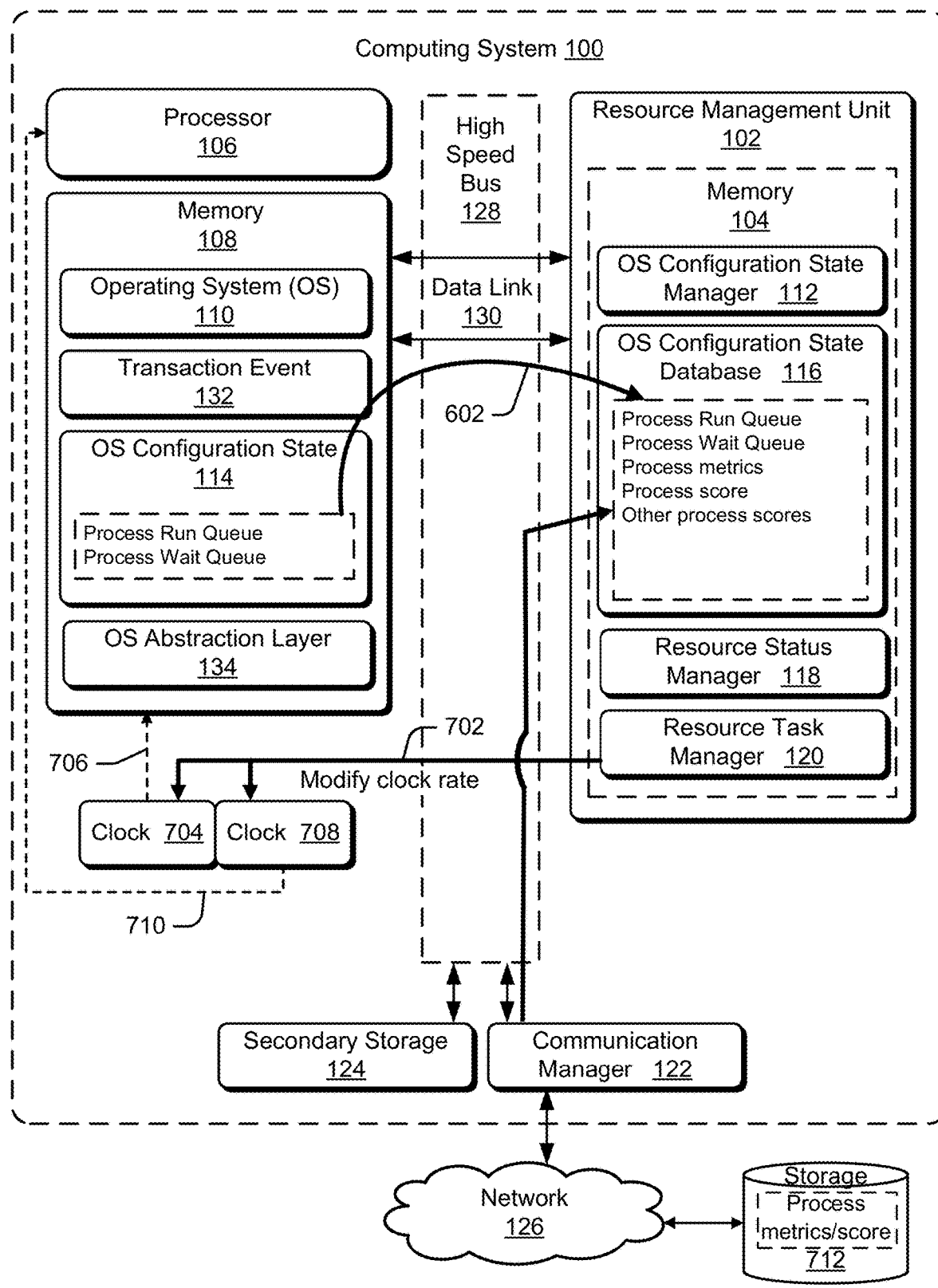
FIG. 7 is a block diagram illustrating an example computing system configured for capturing operating system configuration states by a resource management unit for dynamically scaling clock rates.

FIG. 7 is a block diagram illustrating the example computing system 100 configured for capturing operating system configuration states by a resource management unit for dynamically scaling clock rates. Dynamically scaling clock rates or clock frequency (used interchangeably herein) of clocked components in a computing system achieves benefits including performance boost, power optimizations, thermal dynamic constraints, and reduced processing time. Enabling a resource management unit, rather than a CPU, to dynamically scale clock rates in the system responsive to operating system configuration states, enables more-responsive and relevant scaling to active events, and avoids the CPU wasting resources on scaling tasks so that it may address other computing system operations.

The operating system 110 executes on the processor 106 from the memory 108, and upon detecting an OS transaction event 132, the OS configuration state 114 is captured 602 by the OS configuration state manager 112 of the resource management unit 102 and stored into the OS configuration state database 116 of the memory 104. For simplicity and drawing space limitations, only two example operating system resources are shown in the OS configuration state 114 and the database 116, a process run queue and a process wait queue, although other OS configuration state resources, status indicators, or data may similarly be represented, referenced, identified, and captured by the resource management unit 102 into the database 116.

With the process run queue and process wait queue resources represented in the database 116, the resource management unit resource status manager 118 may then identify the status of a specific resource 116 in those queues and process a task 120 associated with the specific resource to improve the performance of the computing system. In this example, the resource status manager 118 identifies the status of a process resource from the run queue in the database 116 that indicates it requires or would benefit from modifying the clock rate for a clocked component in the computing system. The benefits include to maintain or improve performance of the process, overall system performance, power usage, or thermal dynamics of the computing system 100. In one example, the status of the process resource is identified by referencing the process control block. Factors in the process control block considered may include the process state, scheduling information, memory management data, and accounting data that indicates significant processing time is needed or consumed or that significant memory is needed. By knowing the status of the process, such as when it is going to execute, the resources it needs, and the status of other resources in the computing system, the resource management unit may dynamically scale clock rates accordingly. Modifying the clock rate may include modifying a performance of the processor or access speed of the memory to address load operating conditions, performance, power consumption, thermal dynamics in the computing system, or combinations thereof.

With the captured OS configuration state available 116 that identifies the status of the process, and optionally with other process related metrics available, the resource management unit 102 can identify processing needs and clock-rate modification benefits in advance of what the operating system 110 may actually detect and execute on the processor 106. For example, the OS configuration state, along with associated process metrics or a detected or assigned process score representing process metrics, can show that (i) the identified process needs more memory resources than normal, (ii) the process requires processor intensive activity, (iii) the process may work with reduced memory resources or reduced processor activity, (iv) a particular core in the processor 106 or a memory bank in the memory 108 may be powered down (e.g., clock rate terminated) for a short time, or (v) a hypervisor or virtual machine requires increased or reduced processor activity or memory usage for improved overall system performance.

Where it is determined by the resource status manager 118 that a clock rate of a clocked component in the computing system, such as the processor 106 or the memory 108, may be modified to improve aspects of the process or the computing system 100, then the resource task manager 120 initiates the task of modifying the clock rate for the relevant clocked component. In this depicted example, based on information identified about a process in the OS configuration state database 116, the resource task manager 120 may modify a clock rate 702 for a clock 704 which modifies the clock rate signal 706 to the memory 108. Similarly, in this depicted example, the resource task manager 120 may modify the clock rate 702 for a clock 708 which modifies the clock rate signal 710 to the processor 106. The resource task manager 120 may similarly modify the clock rate 702 to any number of other clocks in the system 100 to modify the clock rate signal of other respective clocked components not shown in this example (e.g., a graphics processing unit (GPU), MMU, bus, specific memory bank).

To determine whether a process or the overall system may benefit from modifying the clock rate, any number of factors relating to the process, its process control block, and the OS configuration state 114 may be considered including, for example, memory usage, memory need, scheduling, process run queue, process wait queue, process priority data, process run-time remaining data, process scheduling data, hypervisor status, virtual-machine status, or combinations thereof. Alternatively, or in combination, processing metrics associated with a process (process metrics) may be considered that are indicative of resources used and system metrics associated with execution of the process. Process metrics may be captured, assigned a score, and stored in the database 116, or the score may be detected or obtained if it was previously assigned to the process. Process metrics may be captured and obtained by monitoring the process during execution on the processor 106 or, if available, retrieved from the database 116 or a storage resource 712 external to the computing system 100 and accessible via communication manager 122 and the network 126.

Process metrics that reflect resources used and related processing data may be obtained by using an operating system analysis tool, such as a Linux operating system event-oriented observability tool, e.g., "perf." This allows for tracking performance counters, events, trace points, tasks, workload, control-flow, cache misses, page faults, and other profiling aspects of the operating system. Metrics of the process that are captured using an observability or profiling tool, or obtained from the external storage resource 712, are maintained in the database 116 for the resource status manager 118 to reference in determining whether modifying a clock rate of a component may be advantageous for the process or system overall. Modifying the clock rate based on process metrics may be advantageous in any number of events including, for example, increasing the clock rate for the memory 108 if the process score or metrics indicate that the process requires heavy memory usage, or increasing the clock rate for the processor 106 if the process score or metrics indicate that the process requires heavy processing, or reducing the clock rate for the processor to reduce thermal issues if the process score or metrics indicate heavy processing that creates increased thermal issues.

Because the process score represents the processing metrics associated with the process, it enables the resource status manager 118 to quickly and easily identify whether the process or the system would benefit from modifying a clock rate of a clocked component. The score also enables the resource status manager 118 to easily compare the process with scores of other processes in the system. A score may be obtained from the external storage resource 712 if the process is one that has been previously associated with a score. For example, a process that represents a game played by users on a computing device may be assigned a score relative to its known processing metrics as used in other computing devices or systems. That score may then be stored in the external storage resource 712 as associated with that particular process and leveraged by the resource management unit 102 to quickly and easily determine benefits of modifying clock rates for the process in the computing system 100.

The resource task manager 118 may also detect other scores associated with other process statuses stored in the OS configuration state database 116, or assign other scores to those other processes based on processing metrics detected, or obtain other scores of other processes from the storage resource 712, all representative of processing metrics associated with those other processes and resources used by those processes. The resource task manager may then compare the process score to the scores of the other processes to determine if, when, and how to modify clock rates for clocked components in the computing system 100 for improved system performance.

For example, the process score may be compared with respect to a score of another process, or to a combination of scores of multiple other processes in the process run queue, and in an event that the score of the other process or a combined score of the multiple other processes meets a given threshold indicative for modifying the clock rate of the component, then the clock rate of that component may be modified. As one example, if the process score is weighted very heavy on processor usage, and there are no other process scores in the process run queue that are weighted processor heavy, then the resource task manager 118 may not need to modify the clock rate for the process. On the other hand, if there are other process scores that are weighted processor heavy in the process run queue, then the resource task manager 118 may increase the clock rate for the process relative to the processor 106, the memory 108, or other clocked component.

Figure 8:
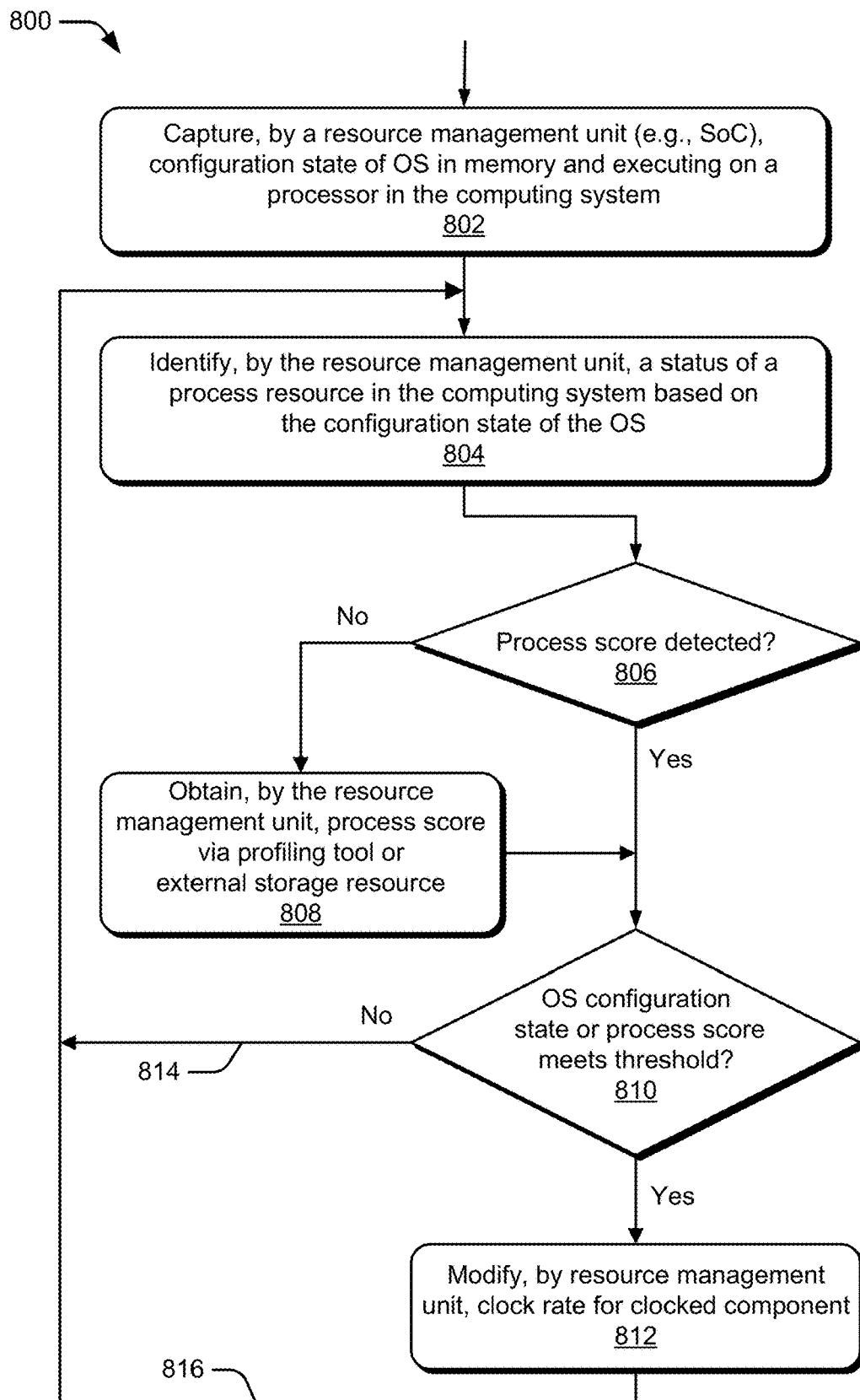
FIG. 8 illustrates an example method for capturing operating system configuration states by a resource management unit in a computing system for dynamically scaling clock rates.

FIG. 8 illustrates an example method 800 for capturing operating system configuration states by a resource management unit for dynamically scaling clock rates. At 802, the resource management unit captures a configuration state of the operating system in memory that is executing on the processor in the computing system, and stores the configuration state to a database associated with the resource management unit. At 804, the resource management unit identifies from the database a status of a process resource in the computing system based on the configuration state of the operating system. In this example for dynamically scaling clock rates, the process may be a process in a run queue waiting to execute on the processor, or a process in the wait queue that has partially executed but is paused and waiting for an event to occur before beginning to execute again.

The resource management unit examines the process status to determine whether the process or the computing system would benefit from modifying a clock rate of a clocked component in the computing system, such as the processor or memory, to maintain or improve performance of the process, overall system performance, power consumption, or thermal dynamics of the computing system. For example, the resource management unit examines the process control blocks of processes in the run queue or wait queue. If a process state, scheduling information, memory management data, and/or accounting data indicate significant processing time still needed or consumed, or significant memory needed, then the processor clock rate or memory clock rate may be increased by the resource management unit to address the need. Another example, at 806, is for the resource management unit to detect whether a process score is associated with the process. The process score represents overall processing metrics associated with the process, and resources used by the process in the computing system and operating system, or in another computing system and operating system external to the computing system with the resource management unit. The process score enables the resource management unit to easily identify whether the process or the system would benefit from modifying a clock rate of a clocked component.

If a process score is not detected 806 in association with the process, then a process score may be obtained 808 from an operating system profiling tool or an external storage resource. While the process is executing in the computing system the process score may be calculated or obtained using standard operating system profiling tools known for tracking performance counters, events, trace points, tasks, workload, control-flow, cache misses, page faults, and other profiling aspects of the operating system. Alternatively, the process score may be obtained from an external storage resource.

At 810, if the OS configuration state or process score meets a threshold, then the resource management unit modifies the clock rate 812 for a clocked component associated with the process or otherwise beneficial to the computing system. If the threshold is not met, then execution control returns 814 for the resource management unit to identify 804 a status of another process resource in the computing system.

To determine whether an OS configuration state meets the threshold 810 for modifying the clock rate, factors associated with the process status are considered including, for example, memory usage, memory need, scheduling, process run queue, process wait queue, process priority data, process run-time remaining data, process scheduling data, hypervisor status, virtual machine status, or combinations thereof. On the other hand, the process score allows the resource management unit to easily compare it to a threshold score 810, or to compare it with scores of other processes in the system to determine if an overall threshold score is met 810. Scores of other processes in the system may be obtained or calculated from a profiling tool while the other processes execute in the computing system, or from an external storage resource if those other processes have been previously associated with a score. If the OS configuration state and/or process score meets the threshold 810, then the resource management unit modifies the clock rate 812 for respective clocked components in the computing system, and execution control returns 816 to identify 804 a status of another process and act on it.

Modifying the clock rate based on the operating system configuration state, process status, and metrics may be advantageous in any number of events. For example, increasing the clock rate for memory may occur if the metrics suggest that the process requires heavy memory usage, or increasing the clock rate for the processor, or a hypervisor or virtual machine may occur if the metrics suggest that any requires heavy processing. On the other hand, reducing the clock rate for the processor may occur to reduce thermal dynamics if the metrics suggest heavy processing that typically creates increased thermal issues, or even terminating a clock rate briefly may occur in certain components if the metrics suggest no activity in those components.

Offloading Memory Management to a Resource Management Unit

Figure 9:
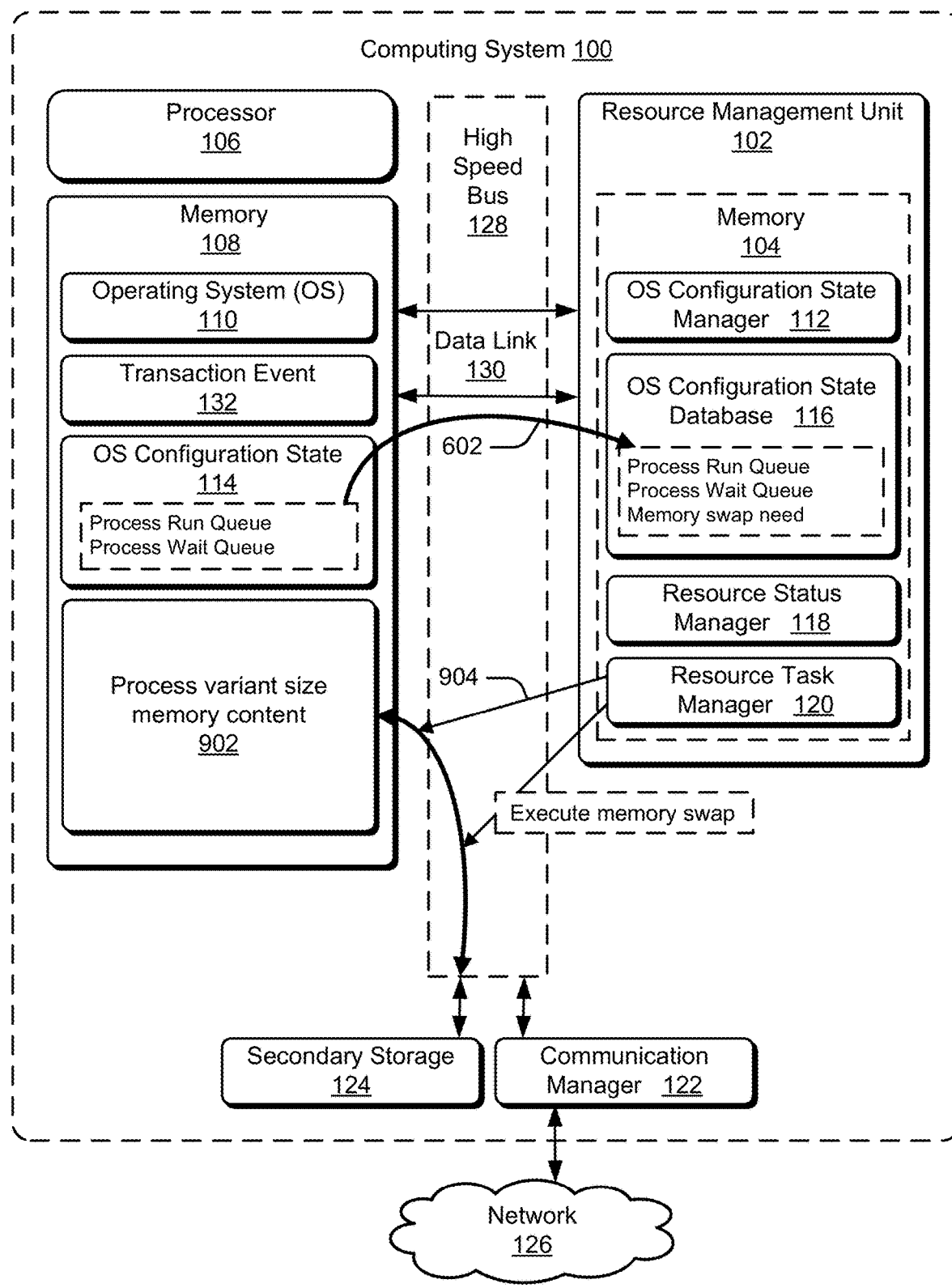
FIG. 9 is a block diagram illustrating an example computing system configured for capturing operating system configuration states by a resource management unit for performing memory management tasks.

FIG. 9 is a block diagram illustrating an example computing system 100 configured with a resource management unit 102 for capturing operating system configuration states and managing memory swapping. The operating system 110 executes on the processor 106 from the memory 108. Upon detecting an OS transaction event 132, the OS configuration state 114 is captured 602 by the OS configuration state manager 112 of the resource management unit 102 and stored into the OS configuration state database 116 of the memory 104. For simplicity of discussion and drawing limitations, only two example operating system resources are shown in the database 116, a process run queue and a process wait queue, although other operating system configuration state resources, status indicators, or data may similarly be represented, referenced, identified, and captured by the resource management unit 102 into the database 116.

With the process run queue and process wait queue resources represented in the database 116, in this example the resource management unit resource status manager 118 identifies a process from the run queue in the database 116 that requires a swap of memory resources 902 associated with the process to maintain or improve overall system performance. The process status and resources associated with the process, or relative to the process, such as identified in the process control block, are identified from the OS configuration state 114 of the operating system 110 as stored in the database 116 by considering any number of aspects. For example, aspects may include memory usage, memory need, secondary memory usage, scheduling, process run queue, process wait queue, process priority data, process run-time remaining data, process scheduling data, status of a hypervisor or virtual machine, or combinations thereof.

The term memory swapping may refer to copying an entire process address space out to a swap device, such as the secondary storage 124, or back, as a single event. And the term paging may refer to copying, in or out, one or more same-size blocks of the address space, at a much finer grain, such as 4K bytes per block, referred to as a page-size. However, for simplicity of discussion in this disclosure, paging and swapping will be used interchangeably to reference the copying of memory content to or from the secondary storage 124.

With the captured OS configuration state available in the database 116, the resource management unit 102 can identify memory swapping requirements for a process in advance of what the operating system will detect and execute on the processor 106, thus avoiding memory page faults and improving computing system performance. For example, the OS configuration state can show that the identified process requires more memory resources to execute than what is currently available in the memory 108, or the process recently completed execution and doesn't require the memory resources. The resource status manager 118 reviews the process in the database 116 to see if it is a good candidate for swapping, e.g., if it has pages that can be swapped in, or discarded from, memory, considering factors such as aging, whether or not the page is locked in memory, or whether the page is shared in memory.

When the resource status manager 118 determines that the process requires memory content 902 to be swapped in, or may be swapped out, the resource task manager 120 executes the memory swap 904 between the memory 108 and the secondary storage 124. If the process needs more memory to execute than what is available in the memory 108, then the resource management unit 102 may move other memory content out to the secondary storage 124 that is not needed for execution at the current time, and the resource management unit swaps in content from the secondary storage 124 that is needed for the process to execute. On the other hand, if the process has completed execution and doesn't need to use the memory content 902, then the resource management unit 102 may move the memory content 902 out to the secondary storage 124 to free up the memory 108.

In another example, the memory content 902 is swapped between the memory 108 and the secondary storage 124 using a variant size of the memory content without a page-size calculation or page-size processing of the content. For example, rather than using a standard set page-size (e.g., 1K, 2K or 4K bytes) to swap the memory content 902, thereby requiring multiple processing tasks of swapping the multiple pages, and potentially using memory less efficiently, the resource management unit 102 may swap the memory content 902 out to the secondary storage 124 in a specific amount needed, either some or all of the memory content 902, or swap it into the memory 108 in the specific amount needed, in one data-stream swap. For example, if the size of memory that needs swapping is 1.5K, then the resource management unit 102 swaps 1.5K. Thus, there is no need to process the swap using a traditional page-size calculation or multi-staged page-processing activity to swap some or all of the memory content 902.

This memory management and swapping can be performed because the resource management unit has an understanding of the OS configuration state 116 and, for example, since both wait queues and scheduling priorities are known, the resource management unit knows what memory each process will use, what memory is free, how much memory is needed to be swapped, how much memory will be needed by a next process in the run queue to execute, and other factors that guide usage of the memory for improved performance in the computing system. The resource management unit 102 can, using its own direct memory access (DMA) and without pausing the processor 106, pre-swap pages for each process before it runs, in the order the process will consume those pages (e.g., using stack and heap pointers for predicting this) and in case there is insufficient memory 108 for those pages. The resource management unit also knows the last process that was executed on the processor 106, and which has the most time left until it is back to a running state, so the resource management unit can evict that last process pages to make more room in the memory 108 for other processing needs.

Similarly, in the context of a hypervisor 136 or virtual machine 138 running in the computing system 100, this memory management processing by the resource management unit 102 for the hypervisor and virtual machine improves their effectiveness, e.g., the hypervisor swapping out or migrating virtual machines. The resource management unit knows which virtual machine will run the latest, and which will be scheduled next, so the resource management unit can fetch the virtual machine to the memory 108 when needed and swap it back to secondary storage after it is done executing, making the hypervisor more effective.

Figure 10:
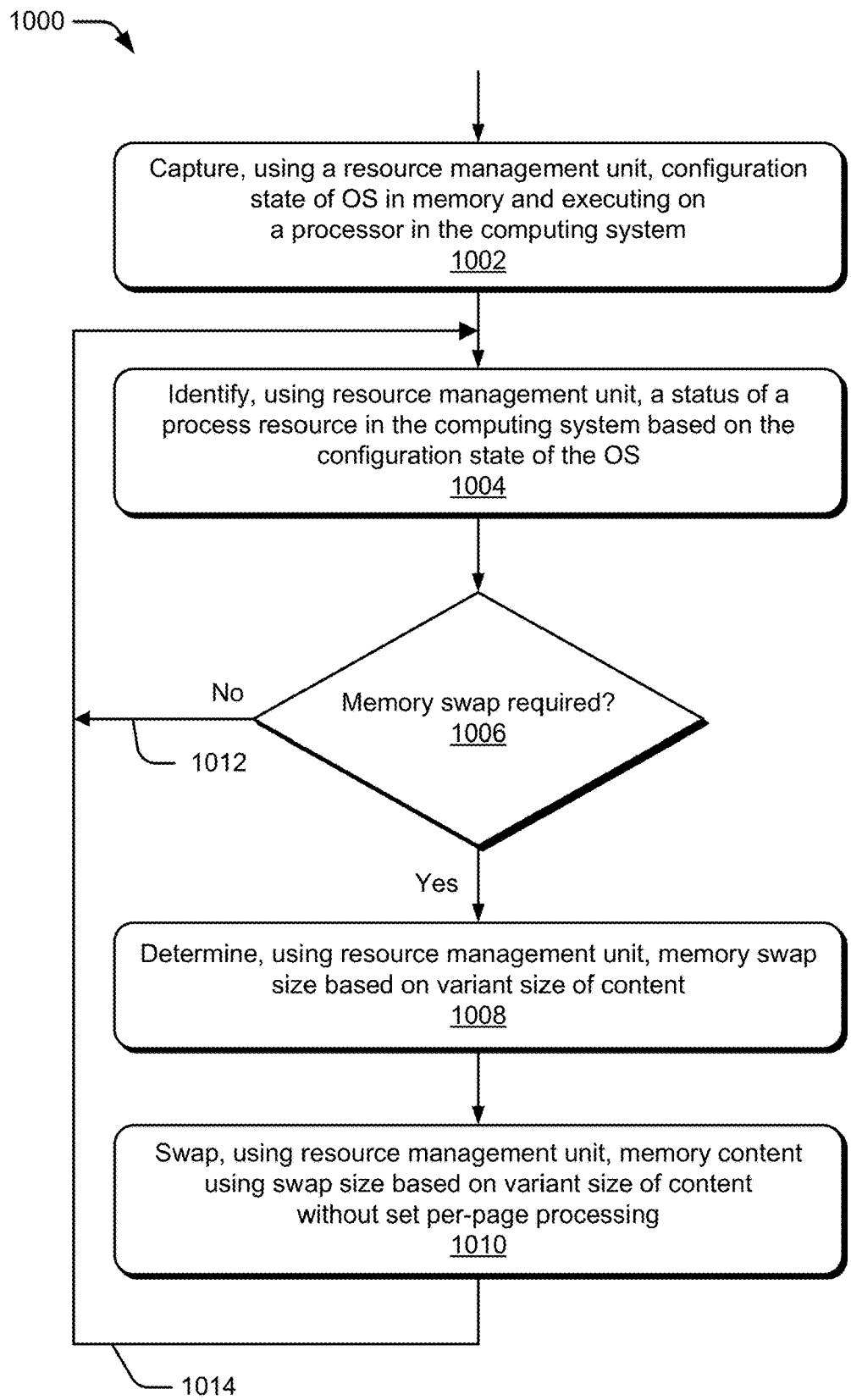
FIG. 10 illustrates an example method for capturing operating system configuration states by a resource management unit in a computing system for managing memory swapping.

FIG. 10 illustrates an example method 1000 for capturing operating system configuration states by a resource management unit in a computing system for managing memory swapping. At 1002, the resource management unit captures a configuration state of the operating system executing on the processor in the computing system, and stores the configuration state to a database (e.g., memory) associated with the resource management unit. At 1004, the resource management unit identifies from the database a status of a process resource in the computing system, as may be referenced in the process control block, based on the configuration state of the operating system. As an example, the process may be a process in a run queue but waiting to execute on the processor, or a process that has partially executed but is paused and waiting in the wait queue for an event to occur before beginning to execute again.

In this example, the resource management unit identifies a process from the run queue in the database as requiring to swap memory resources to maintain process execution or improve system performance. The status of the process, and resources associated with the process or relevant to the process, are identified from the configuration state of the operating system by considering factors such as its memory usage, memory need, secondary memory usage, scheduling, process run queue, process wait queue, process priority data, process run-time remaining data, process scheduling data, hypervisor or virtual machine activity, or combinations thereof.

At 1006, if it is determined that a memory swap is not required, then execution control returns 1012 to identify another process 1004. If is determined 1006 that the process requires memory swapped based on the captured operating system configuration state, then the resource management unit determines a memory swap size 1008. In this example, the memory swap size is based on the variant size of the content to be swapped in the memory for improved system performance and efficient memory usage. Given the captured operating system configuration state, the resource management unit knows the details of the process and other system activities so that it can perform the memory swap based on the variant size of the content, rather than having to perform standard set page-size transfers of the content.

At 1010, the memory content is swapped to or from a secondary storage using, in this example, a swap size based on the variant size of the memory content without using a set page-size limitation. For example, the resource management unit may swap the memory content out to secondary storage, or swap it into the memory from secondary storage, in one data-stream swap using the actual size of the memory content, rather than a set page-size, thereby avoiding multiple processing tasks of swapping multiple pages. After the memory content is swapped 1010, execution control returns 1014 to identify a status of another process 1004.

While the resource management unit is processing all these functions of capturing the operating system configuration state 1002, identifying a process that may require a memory swap 1004, determining whether a memory swap is required 1006, determining the memory swap size 1008, and then actually swapping the memory content 1010, the operating system separately and in parallel continues executing its operations on the processor.

Managing Malware and Vulnerabilities with a Resource Management Unit

Figure 11:
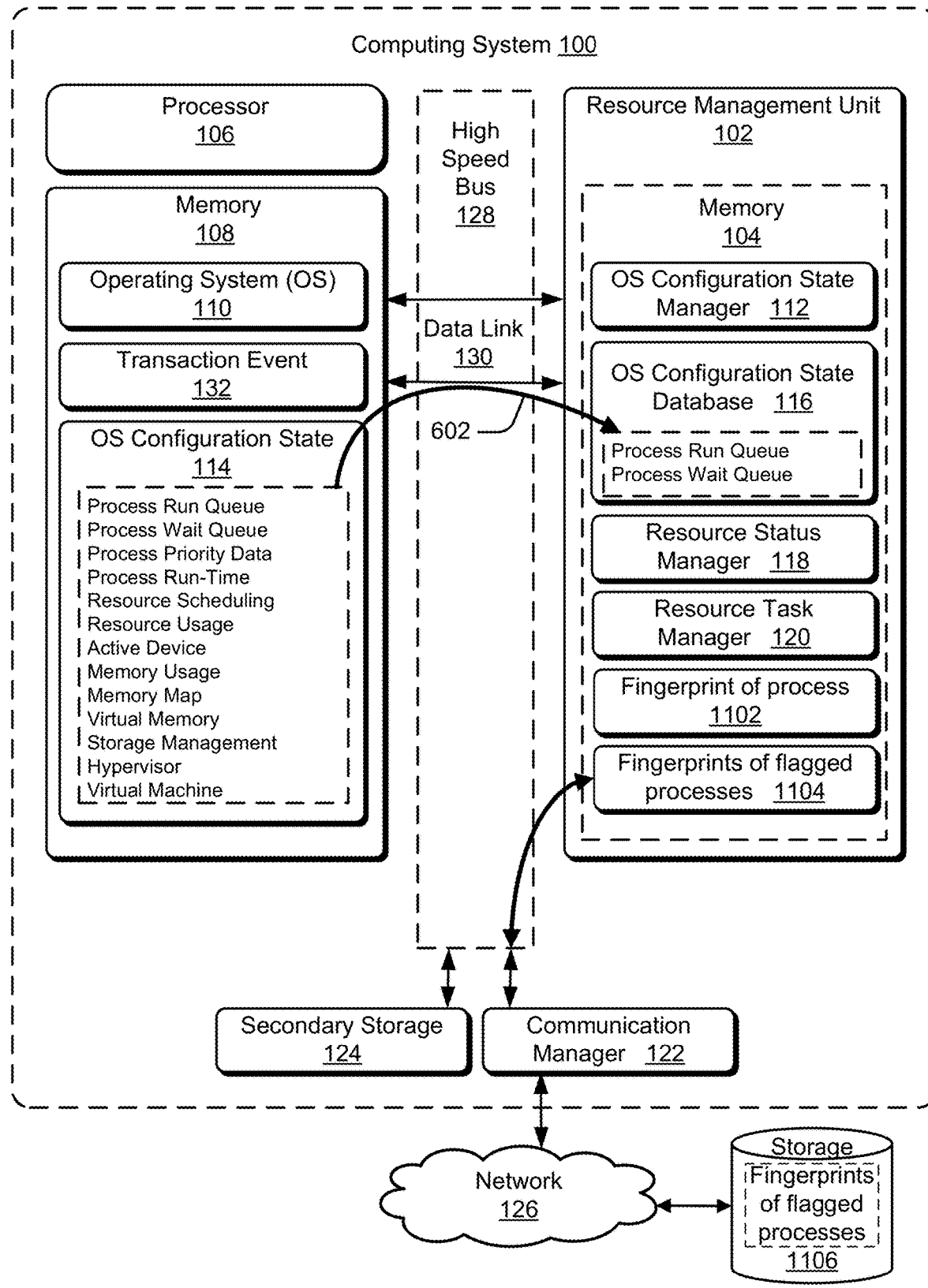
FIG. 11 is a block diagram illustrating an example computing system configured for capturing operating system configuration states by a resource management unit for detecting and managing malware and software vulnerabilities.

FIG. 11 is a block diagram illustrating an example computing system 100 configured to capture operating system configuration states with a resource management unit 102 for detecting and managing malware and software vulnerabilities. The operating system 110 is executing on the processor 106 from the memory 108, and upon detecting an operating system transaction event 132, the OS configuration state 114 is captured 602 by the OS configuration state manager 112 of the resource management unit 102 and stored into the OS configuration state database 116 of the memory 104. For simplicity of discussion and drawing space limitations, only two example operating system resources are shown in the database 116, a process run queue and a process wait queue, although other operating system configuration state resources, data, or status indicators 114 may similarly be represented, referenced, identified, and captured by the resource management unit 102 into the database 116.

With the process run queue and process wait queue resources represented in the database 116, the resource management unit may then identify the status of a resource 118 and process a task 120 associated with the resource to improve the performance of the computing system. In this example, the resource management unit resource status manager 118 identifies a first process from the run queue in the database 116 as ready to be executed (e.g., by referencing the process control block). Prior to execution of the first process, a fingerprint of the first process is identified (e.g., generated) 1102 by the resource task manager 120 to subsequently compare to a plurality of fingerprints of flagged processes 1104 stored in the memory 104. In other aspects, the fingerprint of the first process is identified at multiple points in time, such as before, during, and/or immediately after execution, to capture a potential rolling (e.g., changing) fingerprint of the process.

For this disclosure, a fingerprint represents one or more aspects, characteristics, schemes, traits, or perspectives that identify the process or its binary or source files. For example, the fingerprint may relate to, or be generated from, (i) the binary program file of the process, (ii) the source program file of the process, (iii) a perspective of the process in memory while the process executes (e.g., as the process code may dynamically morph in memory while executing, including rolling or scattered execution changes in memory such as from a code segment to a data segment), and/or (iv) a perspective of the process in memory, or its binary file, or its source file, or some combination thereof, as generated by a machine learning algorithm. Accordingly, a single process may have multiple fingerprints, and the multiple fingerprints may be linked for association purposes.

The fingerprint of the first process may be identified by executing a hash function on the first process (e.g., by executing a hash function on the binary program file or source program file of the first process, or on code or data of the process as it exists in memory for execution by the processor). For example, a rolling hash function may be applied where the process data is hashed in a window that moves through the data, or a Rabin fingerprinting scheme may be applied using polynomials. The fingerprint may also be identified by passing the first process though a search filter, such as a regular expression (e.g., regex or regexp) engine. This may be accomplished by applying the search filter to the (i) binary program file of the process, (ii) source program file of the process, (iii) code or data of the process as it exists in memory, and/or (iv) data, memory or devices the process is accessing. Such regular expression functionality may be applied recursively, or iteratively, using varying parameters to progressively narrow the scope and results. The fingerprint generation method simply aligns with the fingerprint generation method of the plurality of fingerprints of flagged processes 1104 stored in the memory 104 of the resource management unit so that an accurate comparison may be made.

The plurality of fingerprints of flagged processes 1104 are indicative of processes, executable files, programs, applications, operating systems, or other software that include executable instructions or are binary program files that have a known vulnerability or have been identified as malware. Examples of malware may be in the form of a virus, trojan, worm, adware spyware, or ransomware, or any software that is specifically designed to disrupt, damage, or gain unauthorized access to or control of the computing system, or to steal or corrupt data. A vulnerability is any weakness in the software or in the operating system that may be exploited to disrupt, damage, or gain unauthorized access to or control of the computing system, or compromise or cause unintended behavior of the computing system.

The fingerprints of the flagged processes 1104 may be obtained periodically (meaning occasionally or continuously as system parameters allow) by the resource task manager 120 from an external storage 1106 through the resource management unit communication manager 122 and the network 126. The external storage 1106 may be a database on a local network external to the computing system, or a database located in a remote computing environment, such as a cloud computing environment or multi-cloud environment, accessed via the Internet. The external storage 1106 maintains a list of fingerprints of known malware and vulnerable software. The resource management unit accesses the external storage 1106 periodically to update its own memory of fingerprints of flagged processes 1104.

The resource management unit 102 compares the fingerprint of the first process 1102 to the fingerprints of the flagged processes 1104 stored in the memory 104 of the resource management unit. Alternatively, or in combination with comparing to the fingerprints of the flagged processes 1104 stored in the memory 104, the resource management unit may compare the fingerprint of the first process to the fingerprints of the flagged processes as stored in the external storage 1106.

If there is not a match of the fingerprint of the first process 1102 to any of the fingerprints of the flagged processes 1104, then no action is taken, and the resource management unit 102 and the processor 106 continue executing their normal commands and functions. However, if there is a match of the fingerprint of the first process 1102 to at least one of the fingerprints of the flagged processes 1104, then the first process is recognized as malware or a vulnerable process, as the case may be, and the resource task manager 120 takes action to protect the computing system from unwanted effects of the first process. Such action may include any number of separately actionable or coordinated events between the resource management unit, the processor, and/or the operating system to protect the computing system. For example, such action may include notifying a user of the computing system, prohibiting execution of the first process, suspending scheduling of the first process, limiting execution of the first process, stopping execution of the first process, archiving the first process in a secure vault, removing the first process completely, stopping certain processing in the computing system, or combinations thereof.

While the resource management unit is processing all these described functions of capturing the OS configuration state 114 and managing malware and vulnerabilities, the operating system 110 separately and in parallel continues executing its operations on the processor 106. This leaves the processor and operating system unburdened by the activities of the resource management unit unless a vulnerable process or malware is detected and acted on.

Figure 12:
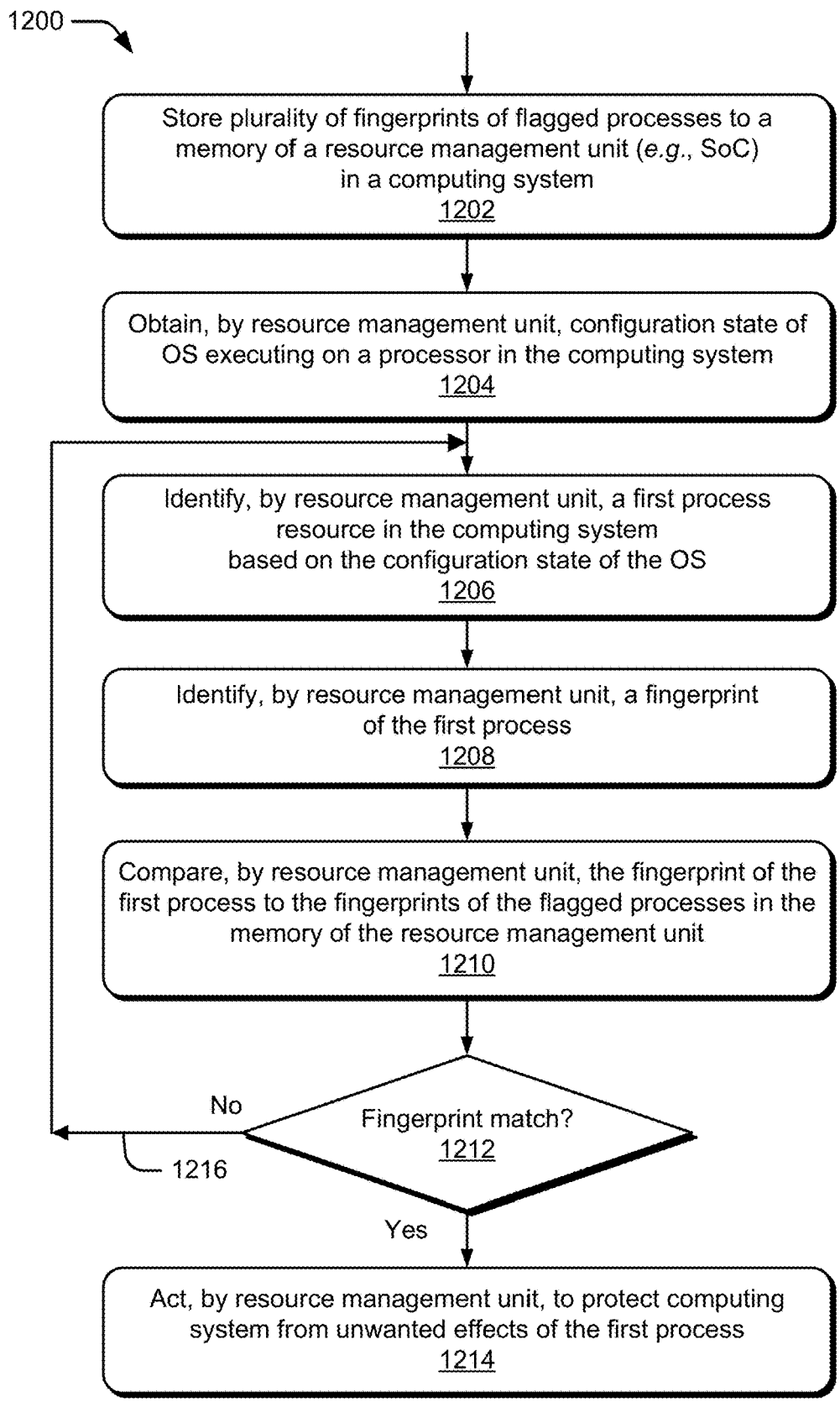
FIG. 12 illustrates an example method for capturing operating system configuration states by a resource management unit in a computing system for detecting and managing malware and software vulnerabilities.

FIG. 12 illustrates an example method 1200 for a resource management unit, such as a SoC, to capture operating system configuration states of an operating system executing on a processor in a computing system, and to detect and manage a vulnerable process or malware in the computing system. At 1202, a plurality of fingerprints of flagged processes are stored to a memory of the resource management unit. The flagged processes are indicative of processes, executable files, programs, applications, operating systems, or other software that include executable instructions that have a known vulnerability or have been identified as malware. The plurality of fingerprints of the flagged processes may be obtained periodically from an external storage which maintains a list of fingerprints of known malware and vulnerabilities. The resource management unit accesses the external storage periodically to update its own memory of fingerprints of flagged processes.

At 1204, the resource management unit obtains a configuration state of the operating system executing on the main processor in the computing system, and stores the configuration state to a database associated with the resource management unit. At 1206, the resource management unit identifies from the database a status of a first process resource in the computing system based on the configuration state of the operating system. As an example, the first process may be a process in a run queue but waiting to execute on the processor, or a process that has partially executed but is paused and waiting in the wait queue for an event to occur before beginning to execute again.

At 1208, the resource management unit identifies a fingerprint of the first process. The fingerprint may be identified, for example, by executing a hash function on the first process to generate a fingerprint, or by passing the first process through a search filter, or some combination thereof. Multiple fingerprints of the first process may also be identified (e.g., generated), at different points in time relative to execution, and linked for association with the process.

At 1210, the resource management unit compares the fingerprint of the first process to the fingerprints of the flagged processes stored in the memory of the resource management unit. Alternatively, or in combination with comparing to the fingerprints of the flagged processes stored in the memory, the resource management unit may compare the fingerprint of the first process to the fingerprints of the flagged processes as stored in the external storage.

If there is not a match 1212 of the fingerprint of the first process to any of the fingerprints of the flagged processes, then execution control returns 1216 for the resource management unit to repeat the steps of identifying another process 1206, identifying a fingerprint 1208, and comparing the fingerprint 1210 to fingerprints of flagged processes. If there is a match 1212 of the fingerprint of the first process to one of the fingerprints of the flagged processes, then the first process is recognized as malware or a vulnerable process, as the case may be, and the resource management unit takes action 1214 to protect the computing system from unwanted effects of the first process. Such action may include any number of actions as described above in reference to FIG. 11.

Notably, while the resource management unit is processing all these functions depicted in the method 1200, and also while the resource management unit repeats processing these functions against different process resources identified in the computing system based on capturing the configuration state of the operating system, the operating system separately and in parallel continues executing its operations on the processor in the computing system for overall improved computing system performance.

While this disclosure has been described with respect to example embodiments outlined above, it is evident that alternatives, modifications, and variations will be apparent to those skilled in the art. Accordingly, the described and depicted embodiments of the present disclosure are intended to be illustrative, not limiting, and the subject of the appended claims is not necessarily limited to the specific features or methods described in this disclosure.

EXAMPLES

In the following paragraphs, some examples are described.

Example 1: A method of managing a computing system (100; 300), the method including: capturing (112; 404; 508), by a resource management unit (102) and into a first memory (104), a configuration state (114) of an operating system (110) in a second memory (108), the operating system (110) executing on a processor (106) of the computing system (100; 300); identifying (118; 406; 510), by the resource management unit (102), a status of a resource (116) in the computing system (100; 300) based on the configuration state (114) of the operating system (110); and processing (120; 408; 512), by the resource management unit (102), a task associated with the status of the resource (116), the processing by the resource management unit (102) effective to alleviate the processor (106) from processing the task.

Example 2: The method of example 1 wherein the resource management unit device communicates with at least one of the processor or the second memory for obtaining the configuration state of the operating system using a low-latency communication data link or a high-speed interface bus, or by being integrated with a same integrated circuit die as the processor.

Example 3: The method of any preceding example wherein processing the task associated with the status of the resource includes managing the resource to improve: a performance of the computing system; a security aspect of the computing system; or a processing of an overhead management activity of the computing system.

Example 4: The method of any preceding example wherein identifying the status of the resource identifies a first process in the first memory, and wherein processing the task includes modifying a clock rate of a component of the computing system based on a status of the first process.

Example 5: The method of any preceding example wherein identifying the status of the resource identifies a first process in the first memory, and wherein processing the task includes modifying a clock rate of the processor, the first memory, the second memory, or another clock-controlled component of the computing system, based on a status of the first process.

Example 6: The method of any preceding example wherein identifying the status of the resource identifies a hypervisor or a virtual machine in the first memory, and wherein processing the task includes modifying a clock rate of a component of the computing system based on a status of the hypervisor or the virtual machine.

Example 7: The method of any of examples 4 to 6, further including obtaining metrics associated with the first process relative to resources used during execution by the computing system and modifying the clock rate of the component based on the metrics.

Example 8: The method of any of examples 4 to 7, further including detecting a first score associated with the first process or assigning a first score to the first process, the first score indicative of resources used by the first process, and modifying the clock rate of the component based on the first score.

Example 9: The method of example 8, further including detecting a second score associated with a second process of the computing system or assigning a second score to the second process, the second score indicative of resources used by the second process, and modifying the clock rate of the component based on the first score of the first process relative to the second score of the second process.

Example 10: The computing system (100; 300) of any of examples 1 to 9 including: the processor (106); the resource management unit (102); and the first or second memory (104, 108) having instructions stored thereon that, responsive to execution by the processor (106) or the resource management unit (102), cause the resource management unit (102) to execute the method of any of examples 1 to 9.

Example 11: The computing system (100; 300) of any of examples 1 to 9 including: the processor (106); the resource management unit (102); and the first and second memory (104; 108) being a shared memory having instructions stored thereon that, responsive to execution by the processor (106) or the resource management unit (102), cause the resource management unit (102) to execute the method of any of examples 1 to 9.

Example 12: The computing system (100; 300) of any of examples 1 to 9 including: the processor (106); the resource management unit (102) including a system-on-chip, an application-specific integrated circuit, or an application-specific standard product; and the first or second memory (104; 108) having instructions stored thereon that, responsive to execution by the processor (106) or the resource management unit (102), cause the resource management unit (102) to execute the method of any of examples 1 to 9.

Example 13: The computing system (100; 300) of any of examples 1 to 9 including: a hypervisor (136) or a virtual machine (138); the processor (106); the resource management unit (102); and the first or second memory (104; 108) having instructions stored thereon that, responsive to execution by the processor (106) or the resource management unit (102), cause the resource management unit (102) to execute the method of any of examples 1 to 9.

Example 14: The first or second memory (104, 108) of any of examples 1 to 9 including instructions that, when executed by the processor (106) or the resource management unit (102), cause the resource management unit (102) to perform the method of any of examples 1 to 9.

Example 15: The computing system (100; 300) of any of examples 1 to 9, further including means to perform the method of any of examples 1 to 9.

Example 16: The method of any preceding example wherein capturing the configuration state of the operating system includes obtaining operational status information of the operating system concerning at least one of a process run queue, a process wait queue, process priority data, process run-time remaining data, resource scheduling data, resource usage data, active device data, memory usage data, memory mapping data, virtual memory tables, storage management data, a status of the hypervisor, a status of the virtual machine, a status of a guest operating system in the virtual machine, resources of the computing system used by the hypervisor, resources of the computing system used by the virtual machine, or combinations thereof.

Example 17: The method of any preceding example wherein identifying the status of the resource in the computing system includes accessing the first memory and identifying a status of at least one of a process run queue, process wait queue, process priority data, process run-time remaining data, resource scheduling data, active device data, memory usage data, memory mapping data, virtual memory tables, storage management data, hypervisor, virtual machine, the guest operating system in the virtual machine, resources of the computing system used by the hypervisor, resources of the computing system used by the virtual machine, or combinations thereof.

Example 18: The method of any preceding example wherein capturing the configuration state of the operating system includes an abstraction layer of instructions coordinating with the operating system as executed by the processor to detect a resource transaction event associated with the operating system and push the configuration state of the operating system to the first memory of the resource management unit responsive to the resource transaction event.

Example 19: The method of any preceding example wherein capturing the configuration state of the operating system includes the resource management unit detecting a resource transaction event associated with the operating system and pulling the configuration state of the operating system to the first memory of the resource management unit responsive to the resource transaction event.

Example 20: The method of any of examples 4 to 9 wherein modifying the clock rate of the component includes at least one of increasing, decreasing, or terminating the clock rate.

Example 21: The method of any of examples 4 to 9 wherein modifying the clock rate causes a change in at least one of a performance of the processor, an access speed of the memory, a power consumption of the computing system, a thermal dynamic in the computing system, or combinations thereof.

Example 22: The method of example 9 wherein detecting the at least one of the first score or the second score further includes obtaining the at least one of the first score or the second score from a storage resource external to the computing system.

What is claimed is:

1. A method of managing a computing system, the method comprising:
   capturing, by a resource management unit and into a first memory, a configuration state of an operating system in a second memory, the operating system executing on a processor of the computing system, the configuration state comprising a process queue of one or more processes to be executed by the processor;
   identifying, by the resource management unit and based on the configuration state of the operating system, a resource of the computing system to be used by the one or more processes in the process queue when executed, the identifying the resource identifies at least one of a hypervisor or a virtual machine in the second memory that is configured to use the resource to execute;
   obtaining metrics associated with a first process relative to the resource or other resources used by the computing system to execute the first process;
   determining a first score, the first score associated with the first process; and
   processing, by the resource management unit, a task associated with the resource, the task including altering the resource of the computing system to be used by the one or more processes to improve a capability of the computing system to execute the one or more processes using the processor, the processing of the task comprises modifying a clock rate of a component of the computing system based on at least one of a status of the at least one hypervisor or the virtual machine, the obtained metrics, or the determined first score.

2. The method of claim 1, wherein the capturing comprises a determination of the configuration state and a storage of the configuration state in the second memory.

3. The method of claim 1, wherein the resource management unit communicates with at least one of the processor or the first memory for obtaining the configuration state of the operating system using a low-latency communication data link or a high-speed interface bus, or by being integrated with a same integrated circuit die as the processor.

4. The method of claim 1, wherein processing the task associated with the resource comprises altering the resource to improve at least one of:
   a performance of the computing system;
   a security aspect of the computing system; or
   a processing of an overhead management activity of the computing system.

5. The method of claim 1, wherein:
   identifying the resource identifies a first process in the second memory that is configured to use the resource to execute; and
   processing the task comprises modifying a clock rate of a component of the computing system based on the first process.

6. The method of claim 1, wherein:
   identifying the resource identifies a first process in the second memory; and
   processing the task comprises modifying a clock rate of the processor, the first memory, the second memory, or another clock-controlled component of the computing system, based of the first process.

7. The method of claim 1, wherein the determination of the first score comprises detecting the first score associated with the first process or assigning the first score to the first process, and wherein the first score is indicative of the resource or other resources used by the first process.

8. The method of claim 1, further comprising detecting a second score associated with a second process of the computing system or assigning a second score to the second process, the second score indicative of resources used by the second process.

9. The method of claim 8, wherein modifying the clock rate of the component based on the first score of the first process is relative to the second score of the second process.

10. A computing system comprising:
   a processor;
   a resource management unit; and
   a first or second memory having instructions stored thereon that, responsive to execution by the processor or the resource management unit, perform operations comprising:
   capturing, by a resource management unit and into a first memory, a configuration state of an operating system in a second memory, the operating system executing on a processor of the computing system, the configuration state comprising a process queue of one or more processes to be executed by the processor;
   identifying, by the resource management unit and based on the configuration state of the operating system, a resource of the computing system to be used by the one or more processes in the process queue when executed, the identifying the resource identifies at least one of a hypervisor or a virtual machine in the second memory that is configured to use the resource to execute;
   obtaining metrics associated with a first process relative to the resource or other resources used by the computing system to execute the first process;

determining a first score, the first score associated with the first process; and processing, by the resource management unit, a task associated with the resource, the task including altering the resource of the computing system to be used by the one or more processes to improve a capability of the computing system to execute the one or more processes using the processor, the processing of the task comprises modifying a clock rate of a component of the computing system based on at least one of a status of the at least one hypervisor or the virtual machine, the obtained metrics, or the determined first score.

11. The computing system of claim 10, wherein the first and second memory are a shared memory in which the instructions are stored.

12. The computing system of claim 10, wherein the resource management unit is comprised within a system-on-chip, an application-specific integrated circuit, or an application-specific standard product.

13. The computing system of claim 10, wherein the resource management unit communicates with at least one of the processor or the second memory for obtaining the configuration state of the operating system using a low-latency communication data link or a high-speed interface bus, or by being integrated with a same integrated circuit die as the processor.

14. The computing system of claim 10, wherein the capturing comprises a determination of the configuration state and a storage of the configuration state in the second memory.

15. The computing system of claim 10, wherein processing the task associated with the status of the resource comprises managing the resource to improve at least one of:

a performance of the computing system;

a security aspect of the computing system; or a processing of an overhead management activity of the computing system.

16. The computing system of claim 10, wherein:

identifying the resource identifies a first process in the second memory that is configured to use the resource to execute; and processing the task comprises modifying a clock rate of a component of the computing system based on the first process.

17. The computing system of claim 10, wherein:

identifying the resource identifies a first process in the second memory; and processing the task comprises modifying a clock rate of the processor, the first memory, the second memory, or another clock-controlled component of the computing system, based on the first process.

18. The computing system of claim 10, wherein the determination of the first score comprises detecting the first score associated with the first process or assigning the first score to the first process, and wherein the first score is indicative of the resource or other resources used by the first process.

19. The computing system of claim 10, further comprising detecting a second score associated with a second process of the computing system or assigning a second score to the second process, the second score indicative of resources used by the second process.

20. The computing system of claim 19, wherein modifying the clock rate of the component based on the first score of the first process is relative to the second score of the second process.

* * * * *